United States Patent
Kamizuma et al.

(10) Patent No.: US 12,512,766 B2
(45) Date of Patent: Dec. 30, 2025

(54) POWER CONVERSION DEVICE

(71) Applicant: Hitachi, Ltd., Tokyo (JP)

(72) Inventors: Hiroshi Kamizuma, Tokyo (JP);
Akihiko Kanouda, Tokyo (JP);
Yuuichi Mabuchi, Tokyo (JP);
Kimihisa Furukawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 18/565,578

(22) PCT Filed: Jun. 6, 2022

(86) PCT No.: PCT/JP2022/022709
§ 371 (c)(1),
(2) Date: Nov. 30, 2023

(87) PCT Pub. No.: WO2023/053581
PCT Pub. Date: Apr. 6, 2023

(65) Prior Publication Data
US 2024/0266969 A1    Aug. 8, 2024

(30) Foreign Application Priority Data
Sep. 30, 2021 (JP) ................................. 2021-160319

(51) Int. Cl.
*H02M 7/219* (2006.01)
*H02M 1/00* (2006.01)
*H02M 7/23* (2006.01)

(52) U.S. Cl.
CPC ......... *H02M 7/219* (2013.01); *H02M 1/0009* (2021.05); *H02M 1/007* (2021.05); *H02M 1/0074* (2021.05); *H02M 7/23* (2013.01)

(58) Field of Classification Search
CPC .. H02M 1/0009; H02M 1/007; H02M 7/0074; H02M 7/219; H02M 7/23
See application file for complete search history.

(56) References Cited

U.S. PATENT DOCUMENTS

| | | | |
|---|---|---|---|
| 2013/0063981 A1* | 3/2013 | Dujic | H02M 1/4233 363/16 |
| 2015/0180352 A1* | 6/2015 | Mester | B60L 9/12 363/21.03 |

(Continued)

FOREIGN PATENT DOCUMENTS

| | | |
|---|---|---|
| JP | 2004-104957 A | 4/2004 |
| JP | 2004-112894 A | 4/2004 |

(Continued)

OTHER PUBLICATIONS

International Search Report (PCT/ISA/210) issued in PCT Application No. PCT/JP2022/022709 dated July 19, 2022 with English translation (4 pages).

(Continued)

Primary Examiner — Gary L Laxton
(74) Attorney, Agent, or Firm — Crowell & Moring LLP

(57) ABSTRACT

A plurality of power conversion units, a current sensor that detects a current at an output terminal of the power conversion unit, and a control unit that measures a frequency component in a predetermined frequency range of a current detected by the current sensor are included, the power conversion unit includes an AC/DC converter that outputs AC power at an input terminal to an output terminal, a smoothing capacitor that is connected in parallel to the output terminal and smooths an output voltage, and a variable resistance switch connected between one end of the smoothing capacitor and one end of the output terminal, the control unit controls a resistance value of the variable resistance switch according to a magnitude of a predetermined frequency component detected by the current sensor, and the output terminals of the plurality of power conversion units are connected in parallel to constitute output terminals.

12 Claims, 11 Drawing Sheets

(56) References Cited

U.S. PATENT DOCUMENTS

2017/0214324 A1* 7/2017 Fujita ................... H02M 7/162
2021/0184499 A1* 6/2021 Huang ..................... H02J 7/02

FOREIGN PATENT DOCUMENTS

| JP | 2006-311740 A | 11/2006 |
|----|---------------|---------|
| JP | 2010-252535 A | 11/2010 |
| JP | 2019-9923 A | 1/2019 |
| JP | 2019-54581 A | 4/2019 |
| JP | 2019-213424 A | 12/2019 |
| JP | 2020-80627 A | 5/2020 |

OTHER PUBLICATIONS

Japanese-language Written Opinion (PCT/ISA/237) issued in PCT Application No. PCT/JP2022/022709 dated July 19, 2022 with English translation (6 pages).

* cited by examiner

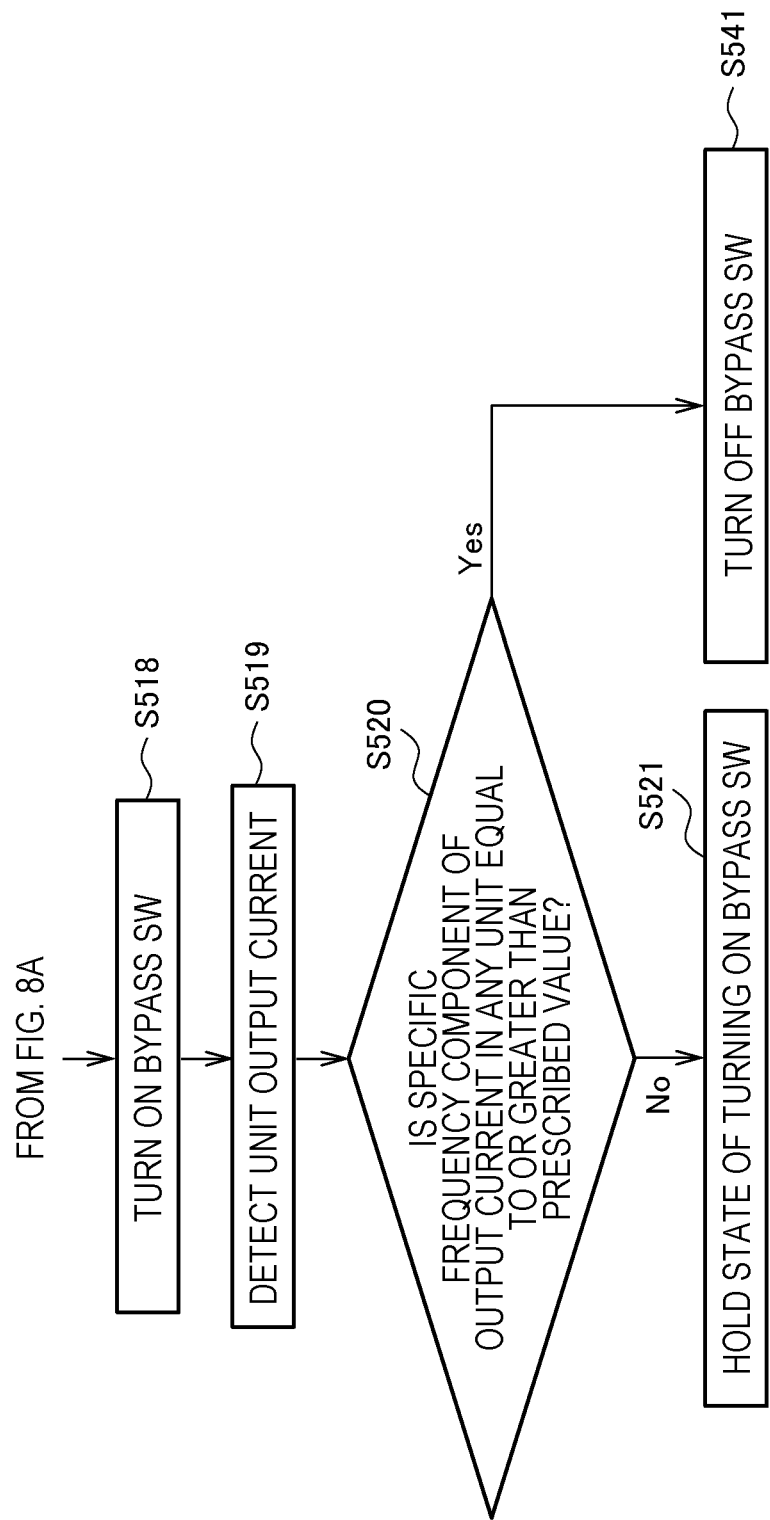

POWER CONVERSION DEVICE

TECHNICAL FIELD

The present invention relates to a power conversion device.

BACKGROUND ART

Recent power conversion devices achieve faster switching operation by technical innovation of a power semiconductor module, which is a main component thereof, and reduce a loss generated from this power semiconductor. Thus, reducing heat generation due to a loss enables downsizing of the cooler in particular, and enables downsizing of the power conversion device. The efficiency of the power conversion device can be improved by reducing the loss of the power semiconductor.

For example, since a wide band gap device of such as silicon carbide (SiC) or gallium nitride (GaN) has an electron saturation speed about twice or greater that of silicon (Si), reduction of a switching loss due to a high-speed switching operation and a radio frequency inverter switching operation become possible.

For industrial power converters, an increase in high-withstand-voltage of the system voltage has been advanced for an increased efficiency of the system. The high-withstand-voltage of the system voltage makes it possible to reduce the current and conduction loss in the same power, and increase the efficiency of the system.

However, since the withstand voltage of the power semiconductor module is limited, a power converter configuration in which a plurality of power conversion units including a power semiconductor device are connected in series to increase the withstand voltage of system voltage of the power converter has been proposed.

In order to increase system efficiency, application of DC distribution in which a distribution line from the power converter to the load is a DC has been studied. The application of DC power distribution makes it possible to reduce the current and conduction loss in the same power, and increase the efficiency of the system.

However, since the withstand voltage of the power semiconductor module is limited, a power converter configuration in which a plurality of power conversion units including a power semiconductor device are connected in series to increase the withstand voltage of system voltage of the power converter has been proposed.

As background technology of the present technical field, technologies of PTL 1, PTL 2, and PTL 3 have been disclosed.

PTL 1 describes in [ABSTRACT] that "[PROBLEM TO BE SOLVED] To provide a power conversion device and a power conversion method capable of reducing harmonic wave of AC output without pulsating voltage between DC terminals PN. [SOLUTION] A power conversion device 1 constitutes between a P terminal and an N terminal of a DC terminal 5 a leg by a series circuit of a P side arm ARMP composed by connecting a plurality of unit converters 2 in series and an N side arm ARMN composed by connecting a plurality of unit converters 2 in series, and a connection point of the P side arm ARMP and the N side arm ARMN is connected to three phases (U, V, and W) of an AC terminal 4 respectively." and discloses a technology of a power conversion device.

Thus, PTL 1 describes a high-voltage converter configuration compatible with high-voltage AC input/high-voltage DC output, where AC input and DC output of a plurality of units are connected in series in a conversion unit including an AC/DC conversion circuit that converts AC into DC. PTL 1 describes that the high-voltage converter unit is configured in three sets in order to correspond to three-phase UVW input, and DC output of the high-voltage converters corresponding to the U phase, the V phase, and the W phase are connected in parallel.

PTL 2 describes in [ABSTRACT] "[PROBLEM TO BE SOLVED] To provide a charger capable of improving reliability. [SOLUTION] A charger for charging multiple power storage devices comprises multiple converter cells (20-1 through 20-M) outputting DC power, a switcher (21) having multiple input ports (21-$x$1 through 21-$x$M) connected with multiple outputs of the multiple converter cells, and multiple output ports (21-$y$1 through 21-$y$M) connected with the multiple power storage devices, and a control arrangement (22) for adjusting an output voltage of the converter cell connected with any of multiple input ports, according to a voltage of a power storage device connected with any of the multiple output ports, when the switcher connects any of multiple input ports with any of multiple output ports." and discloses a technology of a charging device.

Thus, PTL 2 discloses a technology and a configuration of a high-voltage converter compatible with high-voltage AC input/high-voltage DC output, where in a conversion unit including an AC/DC conversion circuit that converts AC into DC and a DC/DC conversion circuit whose input and output are insulated, the AC input of a plurality of units is connected in series and the DC output of the plurality of units is connected in parallel.

PTL 3 describes in [ABSTRACT] "[PROBLEM TO BE SOLVED] To provide a power conversion apparatus that prevents an increase in resonant current by suppressing resonance of first/second capacitors during switching operation of switching elements of an inverter so as to eliminate the need to correspond to a large current, and consequently, to achieve miniaturization of the first/second capacitors. [Solution] The power conversion apparatus includes: an inverter 6 for converting DC power supplied from a DC power supply 3 by switching operation of switching elements 7, 8 into AC power; a first capacitor 2 arranged on the side of the DC power supply 3 between connection wirings 4, 5; and a second capacitor 15 arranged on the side of the switching elements 7, 8. The equivalent inductances of the connection wirings 4, 5 and the electrostatic capacitance of the first capacitor 2 are set such that the resonance frequency determined by the equivalent inductances of the connection wirings 4, 5 and the electrostatic capacitance of the first capacitor 2 is matched with a frequency band of a high-frequency current superposed from the switching elements 7, 8 on the connection wirings 4, 5 during switching operation of the switching elements 7, 8." and discloses a technology of a power conversion device.

Thus, PTL 3 describes a configuration in which a resonant current can be suppressed by disposing a resonance suppression reactor between two capacitors.

CITATION LIST

Patent Literature

PTL 1: JP 2020-80627 A
PTL 2: JP 2019-213424 A
PTL 3: JP 2010-252535 A

SUMMARY OF INVENTION

Technical Problem

In a high-voltage AC/DC converter, an input terminal and an output terminal are not insulated in a modular multilevel converter (MMC) system, and thus there are problems such as failure expansion at the time of ground fault and noise propagation between input and output. A more reliable system requires a high-voltage AC/DC converter in which input and output are insulated.

In the technology disclosed in PTL 1, an isolated high-voltage AC/DC converter includes a high-voltage power converter applied with a multiple isolation transformer, but there is a problem that the weight and volume of the power converter are increased due to the use of the multiple isolation transformer.

In the technology disclosed in PTL 2, a multi-stage converter (MSC) applied with a radio frequency isolation transformer can reduce the size of the isolation transformer, which is advantageous for space saving. However, in the multi-stage converter, a plurality of power conversion units including an isolated DC/DC conversion circuit are connected in series/parallel to correspond to any input and output voltage from a high voltage to a low voltage. Thus, the multi-stage converter where the plurality of DC output of the power conversion units are connected in parallel has a configuration where the DC link capacitors built in the output of the respective power conversion units and the DC link capacitors of the output of the other power conversion units are connected in parallel. This configuration causes a problem that an anti-resonance point is formed in relation to the inductance value between the capacitors, and a resonant current is generated between the units.

In the technology disclosed in PTL 3, disposing a resonance suppression reactor between capacitors enables a resonant current to be suppressed. However, when this technique is applied to a multi-stage converter (MSC), it is necessary to dispose a reactor at the output of each unit, causing a problem of an increase in the volume of the converter (power conversion device).

An object of the present invention is to provide a power converter in which output sides of a plurality of power conversion units are connected in multiple parallel, the power conversion device being downsized by reducing a resonant current between capacitors of units connected in parallel.

Solution to Problem

In order to solve the above problems, the present invention is configured as follows.

That is, a power conversion device of the present invention includes: a plurality of power conversion units including two primary input terminals and two secondary output terminals; a plurality of current sensors that detect a current flowing through a secondary output terminal of each of the power conversion units; and a control unit that measures a frequency component in a predetermined frequency range of a current detected by the plurality of current sensors, in which the power conversion units include an AC/DC converter that converts AC power having been input between the two primary input terminals to DC power that is output between the two secondary output terminals, an output-side smoothing capacitor connected in parallel between the two secondary output terminals, and smoothing an output voltage output between the two secondary output terminals, and a variable resistance switch connected between one end of the output-side smoothing capacitor and one end of the secondary output terminal, the control unit controls resistance values of a plurality of the variable resistance switches according to magnitudes of predetermined frequency components of a current detected by the plurality of current sensors, and the secondary output terminals of the plurality of power conversion units are connected in parallel to each other to constitute a DC power supply terminal as a power conversion device.

Other means will be described in Description of Embodiments.

Advantageous Effects of Invention

According to the present invention, it is possible to provide a power converter in which output sides of a plurality of power conversion units are connected in multiple parallel, the power conversion device being downsized by reducing a resonant current between capacitors of units connected in parallel.

BRIEF DESCRIPTION OF DRAWINGS

FIG. 8B is a view showing a flowchart example for controlling the bypass switch and the variable resistance switch of the converter cell according to the second embodiment of the present invention.

DESCRIPTION OF EMBODIMENTS

Hereinafter, embodiments for carrying out the present invention (hereinafter represented as "embodiments") will be appropriately described with reference to the drawings.

First Embodiment

The configuration of a power conversion device 1 according to the first embodiment of the present invention will be described with reference to the drawings.

Figure 1:
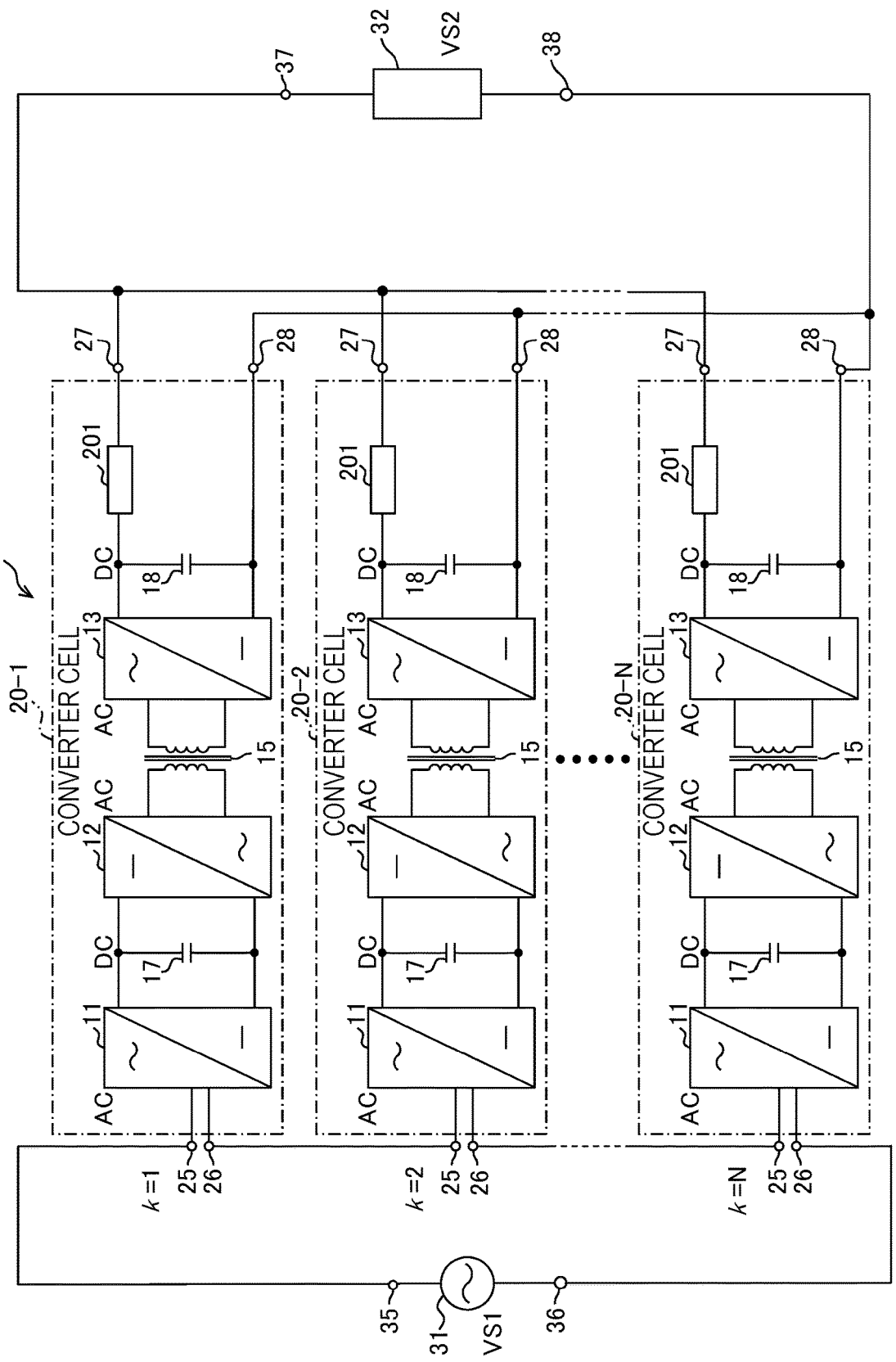
FIG. 1 is a view illustrating a configuration example of a power conversion device according to a first embodiment of the present invention.

FIG. 1 is a view illustrating a configuration example of the power conversion device 1 according to the first embodiment of the present invention.

In FIG. 1, the power conversion device 1 includes converter cells 20-1 to 20-N, which are N power conversion units.

Each converter cell 20-$k$ (k is a stage number, and 1≤k≤N) includes a pair of primary terminals 25 and 26, a pair of secondary terminals 27 and 28, an AC-DC converter 11 (AC-DC converter), an AC-DC converter 12 (DC-AC inverter), and an AC-DC converter 13 (AC-DC converter).

A smoothing capacitor 17 (primary smoothing capacitor), a smoothing capacitor 18 (output-side smoothing capacitor), a variable resistance switch 201, and a radio frequency transformer 15 are included.

A detailed configuration, function, and operation of the above converter cell 20-$k$ will be described later with reference to FIG. 4.

The block of the AC-DC converters 11, 12, and 13 in FIG. 1 uses symbols of "waveform", "oblique line", and "horizontal line", where "waveform" represents AC, "horizontal line" represents DC, and "oblique line" means conversion. That is, under predetermined control, the AC-DC converters 11 and 13 perform AC/DC conversion, and the AC-DC converter 12 performs DC/AC conversion.

The power conversion device 1 according to the first embodiment of the present invention may be bidirectional of a case of inputting from an AC primary system and outputting to a DC secondary system, and a case of inputting from the DC secondary system and outputting to the AC primary system. However, in the first embodiment of the present invention, the main purpose is to describe the role and the effects of the variable resistance switch 201, and thus a case of inputting from the AC primary system and outputting to the DC secondary system will be mainly described.

<<Configuration, Function, and Operation of Power Conversion Device 1>>

Next, an example of a configuration, a function, and an operation of the power conversion device 1 by combining the plurality of converter cells 20-$k$ (1≤k≤N) will be described.

In FIG. 1, the primary terminals 25 and 26 of the converter cells 20-1 to 20-N, which are the N power conversion units, are sequentially connected in series, and a primary power supply system 31 (VS1) is connected to these series circuits (terminals 35 and 36).

As described above, the power transmission in the AC primary system and the DC secondary system is possibly bidirectional.

Therefore, since the primary power supply system 31, which is an AC system, includes not only a genuine AC voltage waveform but also a noise waveform due to a switching operation or the like, equipment of the primary power supply system 31 (VS1) is inclusive of an inductive impedance or a filter reactor.

The secondary terminals 27 and 28 of the converter cells 20-1 to 20-N are connected in parallel to each other, and a DC load system, as a secondary power supply system 32 (VS2) which is a DC system, is connected to the output (output terminals 37 and 38) of the parallel circuits of these converter cells.

As the primary power supply system 31 and the secondary power supply system (DC load system) 32, it is possible to adopt various power generation facilities and power reception facilities such as a commercial power supply system, a photovoltaics system, and a motor.

As described above, the voltage of the primary power supply system 31 is the primary system voltage VS1, and the voltage of the secondary power supply system (secondary load system) 32 is the secondary system voltage VS2.

The primary system voltage VS1 and the secondary system voltage VS2 are independent of each other in amplitude and frequency.

As described above, the power conversion device 1 transmits power unidirectionally or bidirectionally between the primary power supply system 31 and the secondary power supply system 32.

In the pair of terminals (35, 36) of the primary power supply system 31 illustrated in FIG. 1, the terminal 36 is called a primary reference terminal 36.

Similarly, in the pair of terminals (37, 38) of the secondary power supply system 32, the terminal 38 is called a secondary reference terminal 38.

The primary reference terminal 36 is a terminal at which primary reference potential appears, and the secondary reference terminal 38 is a terminal at which secondary reference potential appears. The primary reference potential and the secondary reference potential are, for example, ground potential. However, the reference potential is not necessarily the ground potential.

<Waveform Example of System Voltage in Power Conversion Device and Application to Three-Phase AC System>

Prior to description of details of the converter cell 20-$k$ (1≤k≤N), which is a power conversion unit constituting the power conversion device 1, "Waveform examples of primary system voltage VS1 and secondary system voltage VS2" and "Application of power conversion device 1 to three-phase AC system" will be described first with reference to FIGS. 2 and 3, respectively.

Thereafter, "Details of configuration and function of converter cell 20-$k$" will be described with reference to FIGS. 4 to 6.

<<Waveform Examples of Primary System Voltage VS1 and Secondary System Voltage VS2>>

Waveform examples of the primary system voltage VS1 and the secondary system voltage VS2 will be described.

Figure 2:
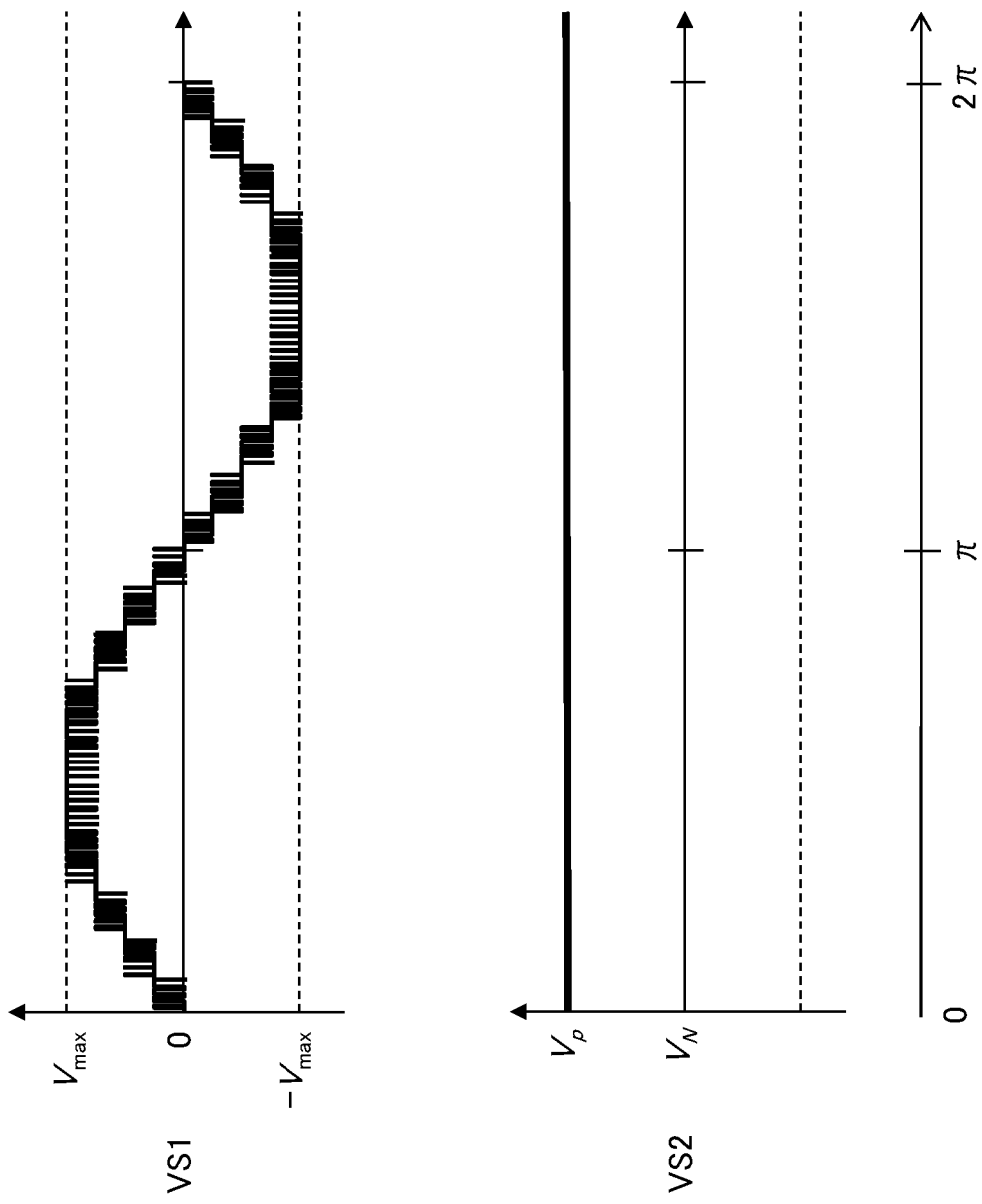
FIG. 2 is a view illustrating waveform examples of a primary system voltage and a secondary system voltage in the power conversion device according to the first embodiment of the present invention.

FIG. 2 is a view illustrating waveform examples of the primary system voltage VS1 and the secondary system voltage VS2 in the power conversion device according to the first embodiment of the present invention.

In FIG. 2, the waveform illustrated in the upper part is a waveform example of the primary system voltage VS1 in which AC voltage is applied to the input of the power conversion device 1. Alternatively, it is a waveform example of a case where the power conversion device 1 outputs the AC voltage to the primary system. A waveform ($V_{max}$, $-V_{max}$) corresponding to one period (0 to $2\pi$) of a sine wave that is an AC waveform is illustrated.

The waveform illustrated in the lower part of FIG. 2 is a waveform example of the secondary system voltage VS2 output from the power conversion device 1, and a voltage between DC voltages ($V_P$, $V_N$) is output. The broken line in the lower view of FIG. 2 corresponds to $N_1$ of the ground potential in FIG. 3 described later, for example.

Note that the AC waveform in the upper part of FIG. 2 illustrates an example in which a noise component is contained in the sine wave.

As described above, the voltage input to the power conversion device 1 is from various power generation facilities such as a commercial power supply system, a photovoltaics system, and a motor, and is not necessarily a genuine sine waveform. There is a case where an AC voltage (AC power) is output from the power conversion device 1 to the primary power supply system 31. Therefore, an example in which the AC waveform in the upper part of FIG. 2 contains a noise component is indicated.

In order to cope with a case where such AC waveform contains a noise component, it is recommended that the primary power supply system 31 is inclusive of an inductive impedance or a filter reactor as described above.

<<Application of Power Conversion Device 1 to Three-Phase AC System>>

Next, an application example of the power conversion device 1 to a three-phase AC system will be described.

Figure 3:
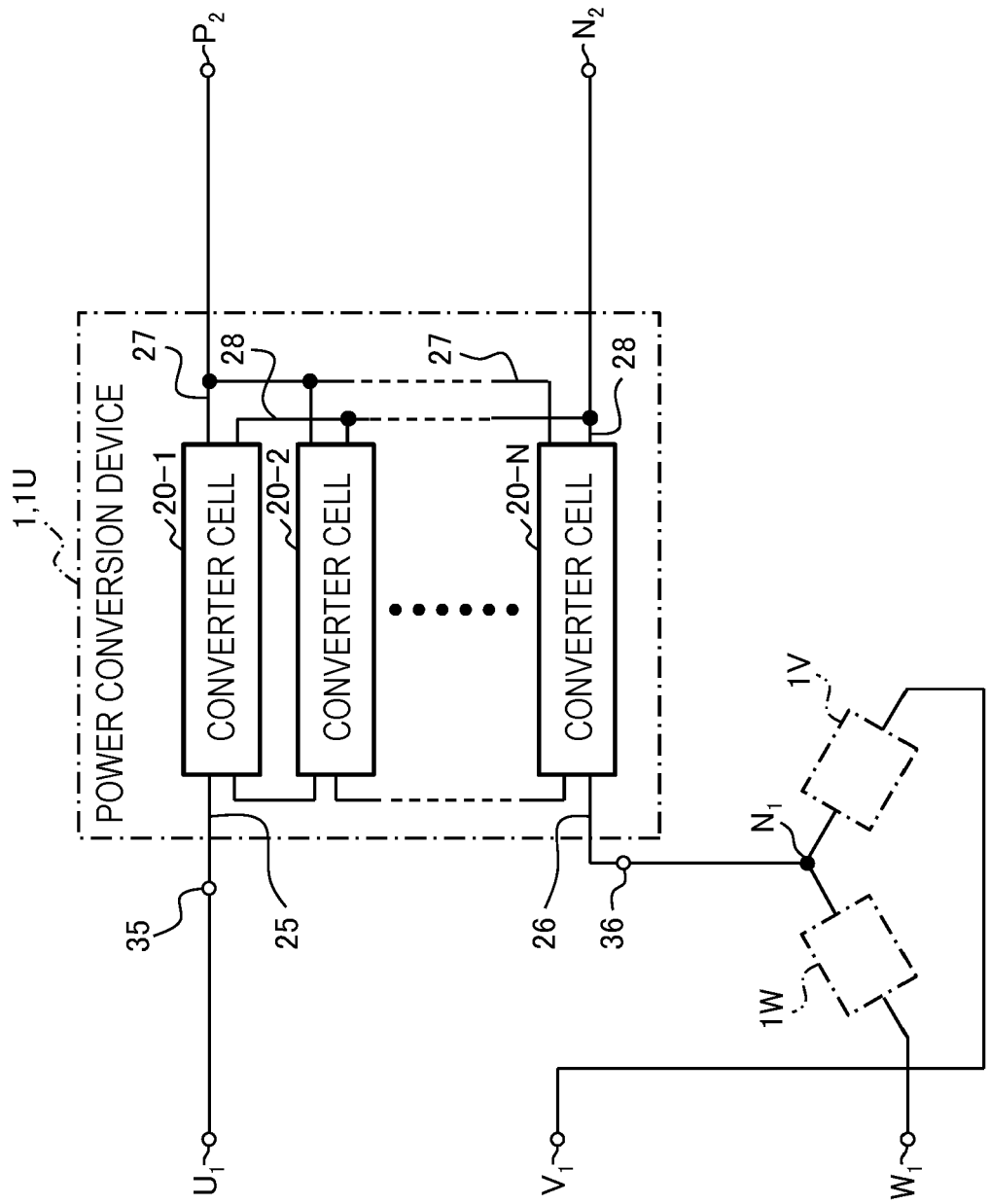
FIG. 3 is a view illustrating a configuration example in which the power conversion device according to the first embodiment of the present invention is applied to a three-phase AC system.

FIG. 3 is a view illustrating a configuration example in which the power conversion device 1 according to the first embodiment of the present invention is applied to a three-phase AC system.

In FIG. 3, three power conversion devices 1 (1U, 1V, 1W) described in FIG. 1 are included, and are applied to three-phase AC (three-phase AC system).

In the power conversion device 1 (1U), a power conversion device is configured by combining the plurality of converter cells 20-$k$ (1≤k≤N) as illustrated in FIG. 1.

Similarly, also in the power conversion device 1 (1V) and the power conversion device 1 (1W), respective power conversion devices are configured by combining the plurality of respective converter cells 20-$k$ (1≤k≤N).

The input terminal (35, 36) of the power conversion device 1U (1) has one end connected to a $U_1$ terminal and the other end connected to an $N_1$ terminal. The output terminal (27, 28) of the power conversion device 1U has one end connected to a $P_2$ terminal and the other end connected to an $N_2$ terminal.

The input terminal (35, 36) of the power conversion device 1V (1) has one end connected to a $V_1$ terminal and the other end connected to the $N_1$ terminal. The output terminal (27, 28) of the power conversion device 1V has one end connected to the $P_2$ terminal and the other end connected to the $N_2$ terminal.

The input terminal (35, 36) of the power conversion device 1W (1) has one end connected to a $W_1$ terminal and the other end connected to the $N_1$ terminal. The output terminal (27, 28) of the power conversion device 1W has one end connected to the $P_2$ terminal and the other end connected to the $N_2$ terminal.

One input terminal (36) of the power conversion device 1U (1) is connected to a neutral point N1. One input terminal (36) of the power conversion device 1V (1) is connected to the neutral point N1. One input terminal (36) of the power conversion device 1W (1) is connected to the neutral point N1.

That is, the input sides of the power conversion device 1U, the power conversion device 1V, and the power conversion device 1W are Y-connected (star connection). Then, three-phase AC power (three-phase AC voltage) is applied among the $U_1$ terminal, the $V_1$ terminal, the $W_1$ terminal, and the neutral point N1.

The $P_2$ terminal and the $N_2$ terminal, which are the output of the power conversion device 1U (1), the power conversion device 1V (1), and the power conversion device 1W (1), are connected in parallel, and DC power (DC voltage) is commonly output.

However, the $P_2$ terminal and the $N_2$ terminal, which are the output of the power conversion device 1U (1), the power conversion device 1V (1), and the power conversion device 1W (1), may independently supply DC power (DC voltage) to different systems.

The configuration of the three power conversion devices illustrated in FIG. 3 achieves a three-phase AC system of power conversion from three-phase AC power to DC power using three-phase AC power (three-phase AC voltage).

<Details of Configuration and Function of Converter Cell 20-$k$>

Details of the configuration and the function of the converter cell 20-$k$ (1≤k≤N), which is a power conversion unit (converter cell 20) of the power conversion device 1 illustrated in FIG. 1, will be described with reference to FIG. 4.

Figure 4:
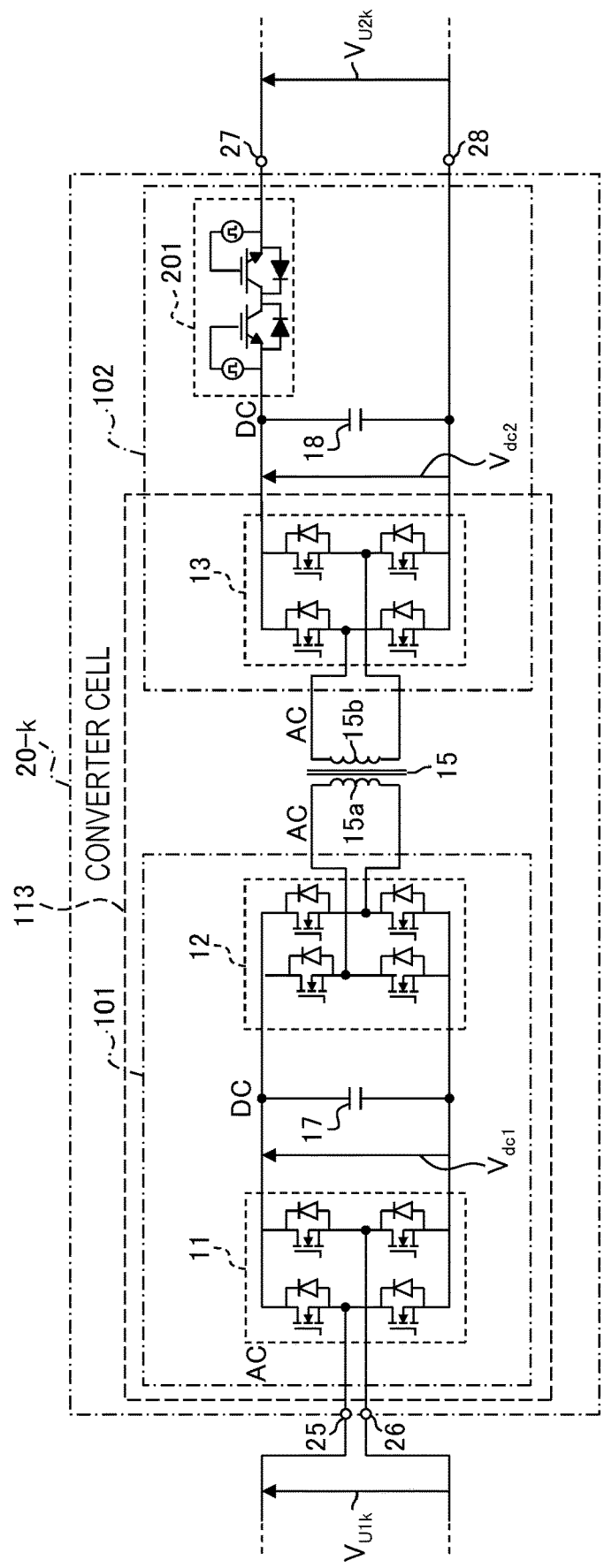
FIG. 4 is a view describing a configuration example and a function example of a converter cell that is a power conversion unit in the power conversion device according to the first embodiment of the present invention.

FIG. 4 is a view describing a configuration example and a function example of the converter cell 20, which is a power conversion unit in the power conversion device according to the first embodiment of the present invention.

As described above, in the power conversion device according to the first embodiment of the present invention may be bidirectional of a case of inputting from an AC primary system and outputting to a DC secondary system, and a case of inputting from the DC secondary system and outputting to the AC primary system.

However, for simplicity, the case of inputting from an AC primary system and outputting to a DC secondary system will be described below.

In FIG. 4, the converter cell 20-$k$ (1≤k≤N) is configured to include a primary power conversion unit 101, a secondary power conversion unit 102, and a radio frequency transformer 15.

The primary power conversion unit 101 receives AC power (AC voltage) from the input terminals (25 and 26) and converts the AC power into a high-frequency AC voltage. Then, the converted high-frequency AC voltage is output to the primary side of the radio frequency transformer 15.

The radio frequency transformer 15 transforms the AC voltage input to the primary side into, for example, a high voltage, and outputs the high-voltage AC voltage to the secondary side. Then, the AC power (AC voltage) transformed to the high voltage is supplied to the secondary power conversion unit 102.

The secondary power conversion unit 102 converts the input high-voltage AC power (AC voltage) into DC power (DC voltage).

<<Details of Configuration and Function of Primary Power Conversion Unit 101>>

In FIG. 4, the primary power conversion unit 101 is configured to include the AC-DC converter 11, the smoothing capacitor 17, and the AC-DC converter 12.

The AC-DC converter 11 (first AC-DC converter) is configured to include four switching elements connected in an H bridge shape, and a total of four diode free wheeling diodes (FWDs) connected in anti-parallel to these switching elements. The smoothing capacitor 17 (primary smoothing capacitor) is connected in parallel to the output side of the AC-DC converter 11.

AC voltage (AC power) is input from the input terminals (25, 26) to the AC-DC converter 11, and the four switching elements connected in an H bridge shape are controlled with a predetermined waveform (pulse width modulation: PWM) by a converter control circuit not illustrated.

Then, the input AC voltage (sine wave) is rectified and converted, and a DC voltage (DC power) is output to both ends of the smoothing capacitor 17.

That is, the AC-DC converter 11 serves as a converter (AC/DC converter) that converts AC power (AC voltage) into DC power (DC voltage).

In this conversion, the diode FWD serves to commutate the load current. As the diode FWD, a parasitic diode can also be used.

As the four switching elements of AC-DC converter 11, for example, a metal oxide semiconductor field effect transistor (MOSFET) is used.

The smoothing capacitor 17 connected in parallel to the output side of the AC-DC converter 11 serves to reduce a ripple from the AC voltage output from the AC-DC converter 11.

Note that a voltage appearing between the primary terminals 25 and 26 of the converter cell 20-$k$ (1≤$k$≤N) is called a primary AC terminal voltage $V_{U1k}$, and a voltage appearing between the both ends of the smoothing capacitor 17 is called a primary DC link voltage $V_{d}$ci (primary DC voltage).

By selecting a control method, the AC-DC converter 11 can mutually convert the primary AC terminal voltage $V_{U1k}$ and the primary DC link voltage $V_{dc1}$. Then, it is possible to transmit power unidirectionally or bidirectionally.

In FIG. 4, similarly to the AC-DC converter 11, the AC-DC converter 12 (second AC-DC converter) is configured to include four switching elements connected in an H bridge shape, and four diode FWDs connected in anti-parallel to these switching elements.

However, the AC-DC converter 12 is different in control waveforms of four switching elements from the AC-DC converter 11. In the AC-DC converter 12, when DC power (DC voltage) is input from smoothing capacitor 17, and the four switching elements connected in an H bridge shape are controlled with a predetermined waveform (pulse width modulation: PWM) different from that of the AC-DC converter 11 by the converter control circuit not illustrated, the DC power (DC voltage) is converted into AC voltage (AC power) having a frequency greater than the frequency of the input terminals (25, 26) and output.

As described above, the primary power conversion unit 101 converts the frequency of the AC voltage (AC power) input from the input terminals (25, 26) into a high frequency.

That is, the primary power conversion unit 101 is also a frequency converter. The primary power conversion unit 101 can convert the frequency of the input AC voltage into either a high frequency or a low frequency, but converts the frequency into a high frequency when outputting the AC voltage to the radio frequency transformer.

The primary power conversion unit 101, which is also a frequency converter, outputs a high-frequency AC voltage (AC power). This high-frequency AC voltage (AC power) is output to the primary side of the radio frequency transformer 15.

<<Radio Frequency Transformer 15>>

The radio frequency transformer 15 includes a primary winding 15$a$ and a secondary winding 15$b$, and transmits power at a predetermined frequency between the primary winding 15$a$ and the secondary winding 15$b$.

In the radio frequency transformer 15, the AC voltage input from the primary power conversion unit 101 is converted into, for example, a high-voltage AC voltage.

Then, the converted, for example, high-voltage AC voltage (AC power) is input to the secondary power conversion unit 102.

The radio frequency transformer 15 efficiently transforms the AC voltage input to the primary side of the transformer at a high frequency, and outputs the AC voltage to the secondary side of the transformer.

The transformer (radio frequency transformer) can downsize a core of the transformer by using a radio frequency when transforming a primary voltage of AC voltage into a secondary voltage. That is, the transformer can be downsized.

Thus, in order to downsize the transformer, the converter cell 20-$k$, which is the above-described power conversion unit adopts a method in which a low-frequency AC voltage of a commercial frequency, for example, is converted into a high-frequency AC voltage, then the AC voltage is supplied to the radio frequency transformer 15, the high-frequency AC voltage is efficiently transformed (e.g., boosted) by the radio frequency transformer 15, and then the high-frequency AC voltage is rectified into a DC voltage and output.

Note that the radio frequency mentioned here is, for example, a frequency of equal to or greater than 100 Hz. Furthermore, it is preferable to employ a frequency of equal to or greater than 1 kHz, and it is more preferable to employ a frequency of equal to or greater than 10 kHz.

Therefore, as described above, the primary power conversion unit 101 is operated as a frequency converter.

<<Details of Configuration and Function of Secondary Power Conversion Unit 102>>

In FIG. 4, the secondary power conversion unit 102 is configured to include the AC-DC converter 13, the smoothing capacitor 18, and the variable resistance switch 201.

Similar to the AC-DC converter 11 described above, the AC-DC converter 13 is configured to include four switching elements connected in an H bridge shape, and diode FWDs connected in anti-parallel to these switching elements. The smoothing capacitor 18 is connected in parallel to the output of the AC-DC converter 13.

AC voltage (AC power) is input from the radio frequency transformer 15 to the AC-DC converter 13, and the four switching elements connected in an H-bridge shape are controlled with a predetermined waveform by the converter control circuit not illustrated with a predetermined waveform, and then AC voltage (AC power) is converted into a DC voltage (DC power).

A voltage appearing between both ends of the smoothing capacitor 18 is called a secondary DC link voltage $V_{dc2}$ (secondary DC voltage).

That is, the AC-DC converter 13 serves as an AC/DC converter that converts AC power (AC voltage) into DC power (DC voltage).

Since the diode FWD has the same configuration as the diode in the AC-DC converter 11, redundant description will be omitted.

Note that it is also conceivable that the primary power conversion unit 101, the radio frequency transformer 15, and the AC-DC converter 13 constitute an AC/DC converter 113.

The smoothing capacitor 18 in FIG. 4 serves to reduce a ripple from the AC voltage output from the AC-DC converter 13 or the AC voltage output from the AC/DC converter 113.

The DC voltage (DC power) with the reduced ripple is output from the output terminals (27, 28) as the output voltage (output power) of the converter cell 20-$k$.

In FIG. 4, the variable resistance switch 201 is included between one end of the smoothing capacitor 18 and the output terminal 27.

The variable resistance switch 201 is for preventing anti-resonance between the plurality of converter cells 20-$k$ (1≤$k$≤N) connected in parallel.

Details of this anti-resonance phenomenon and the variable resistance switch 201 will be described later.

Note that the voltage appearing between the both ends of the smoothing capacitor 18 is called a secondary DC link voltage $V_{dc2}$ (secondary DC voltage). A voltage appearing between the secondary terminals 27 and 28 is called a secondary DC terminal voltage $V_{u2k}$.

An example in which the converter cell 20 (20-k) receives the AC voltage (AC power) from the primary terminals 25 and 26 and outputs the DC voltage (DC power) from the secondary terminals 27 and 28 has been described. However, as described above, depending on the control method, it is also possible to bidirectionally transmit power (AC power to DC power and DC power to AC power) between the primary terminals 25 and 26 and the secondary terminals 27 and 28.

<Phenomenon of Anti-Resonance Associated with Output of Power Converter>

A phenomenon of anti-resonance associated with an output of the power conversion device 1 configured to include the plurality of converter cells 20-k (1≤k≤N) will be described with reference to FIG. 1.

In FIG. 1, the output terminals (27, 28) of the plurality of converter cells 20-k (1≤k≤N) are connected in parallel to each other.

In this configuration, anti-resonance (unnecessary resonant current) may occur between the output-side smoothing capacitors 18 depending on a drive frequency condition of the AC-DC converter 13, which is an AC/DC converter, or a wiring parasitic inductance component between the secondary terminals of the power conversion units connected in parallel.

At this time, the unnecessary resonant current due to the phenomenon of anti-resonance flows through the output-side smoothing capacitor 18 at the secondary output, so that capacitor heat generation increases.

Not only the output-side smoothing capacitor 18 and the wiring parasitic inductance component but also the AC-DC converter 13 and the radio frequency transformer 15 may be involved in the phenomenon of anti-resonance. In some cases, a component of capacitance existing between the DC power supply terminals 37 and 38 caused by the secondary power supply system 32 may be involved.

In the resonance in these cases, a plurality of resonance phenomena exist depending on a plurality of circuit configurations, resonance due to the plurality of resonance paths variously occurs or disappears, and anti-resonance in which these resonance phenomena variously transition can occur.

In order to suppress the ripple current (unnecessary resonant current) due to this anti-resonance and to reduce the capacitor heat generation of the output-side smoothing capacitor 18 due to this ripple current, the variable resistance switch 201 is provided in FIGS. 1 and 4.

<<Variable Resistance Switch 201>>

Figure 5:
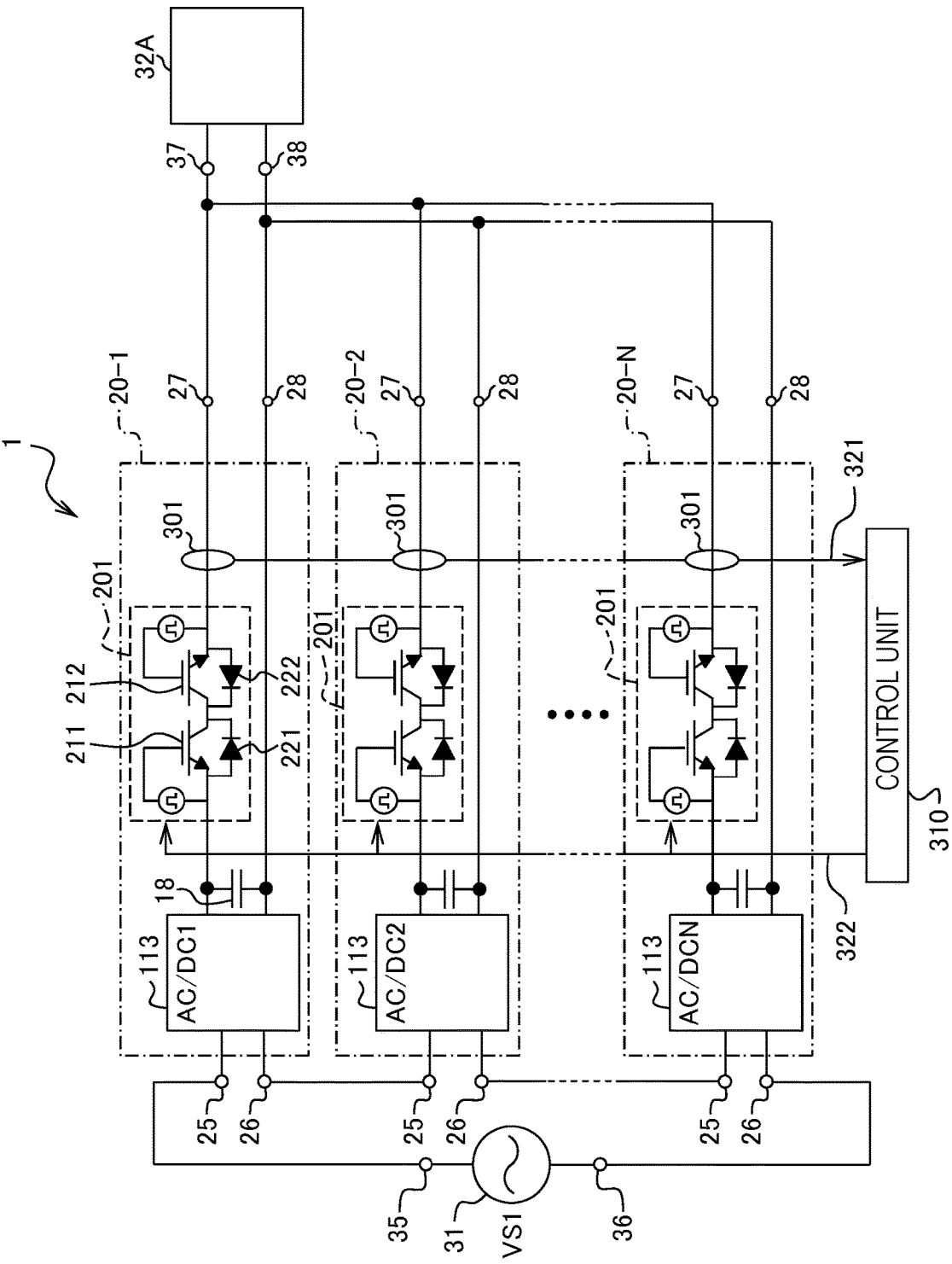
FIG. 5 is a view describing a configuration example and a function example in which the converter cell according to the first embodiment of the present invention includes a variable resistance switch.

FIG. 5 is a view describing a configuration example and a function example in which the converter cell according to the first embodiment of the present invention includes the variable resistance switch 201.

In FIG. 5, the main purpose is to describe the function of the variable resistance switch 201. Therefore, in FIG. 5, the description of the converter cell 20-k (1≤k≤N) is simplified using the AC/DC converter 113.

That is, the AC/DC converter 113 represented by "AC/DC 1", "AC/DC 2", . . . , and "AC/DC N" in FIG. 5 corresponds to a synthesis circuit of the AC-DC converter 11, the smoothing capacitor 17, the AC-DC converter 12, the radio frequency transformer 15, and the AC-DC converter 13 represented as the AC/DC converter 113 in FIG. 4.

Hereinafter, the configuration, the function, and operation of the variable resistance switch 201 will be described with reference to FIG. 5.

In FIG. 5, the converter cell 20-1 is configured to include the AC/DC converter 113, the smoothing capacitor (output-side smoothing capacitor) 18, and the variable resistance switch 201.

The variable resistance switch 201 is configured to include an insulated gate bipolar transistor (IGBT) element, and is connected between one end of the smoothing capacitor (output-side smoothing capacitor) 18 and the output terminal 27.

The variable resistance switch 201 is configured to include a transistor (IGBT element) 211 and a transistor (IGBT element) 212. Note that a parasitic diode (diode) 221 is formed in association with the IGBT element 211, and a parasitic diode (diode) 222 is formed in association with the IGBT element 212.

A cathode of the IGBT element 211 is connected to a cathode of the IGBT element 212.

An emitter of the IGBT element 211 is connected to one end of the smoothing capacitor (output-side smoothing capacitor) 18, and an emitter of the IGBT element 212 is connected to the output terminal 27.

That is, a first circuit in which the transistor (IGBT element) 211 and the diode (parasitic diode) 221 are connected in parallel and a second circuit in which the transistor (IGBT element) 212 and the diode (parasitic diode) 222 are connected in parallel are connected in series to constitute the variable resistance switch 201.

The gates of the IGBT element 211 and the IGBT element 212 are connected to a resistance value control signal 322 of a control unit 310 described later, and the resistance value (resistance component) of the variable resistance switch 201 at the time of conduction of the IGBT elements 211 and 212 can be controlled by the gate drive voltage driven by this resistance value control signal 322.

Note that the IGBT element illustrated in FIG. 5 has a characteristic that a current easily flows and a resistance value decreases when a gate voltage is increased.

In FIG. 5, a current sensor (current detector) 301 that detects a current flowing through one end of the variable resistance switch 201 and the output terminal 27 is provided.

This current sensor 301 is similarly provided in the converter cell 20-k (1≤k≤N).

Current detection signals 321 detected by a plurality of the current sensors 301 are transmitted to the control unit 310.

The control unit 310 senses the current value by the current detection signal 321, and, according to the result, sends a plurality of the variable resistance switches 201 the resistance value control signal 322 for controlling the resistance values of the plurality of variable resistance switches 201. Then, the resistance values (conduction resistance characteristics) of the plurality of variable resistance switches 201 are controlled by the resistance value control signal 322.

The control unit 310 includes a mechanism that controls the resistance value (conduction resistance characteristics) of the variable resistance switch 201 by the current detection signal 321.

In order to determine whether or not anti-resonance has occurred, the control unit 310 focuses on and detects a predetermined frequency component of the detection current by the current detection signal 321.

However, in the phenomenon of anti-resonance, the resonance frequency is not necessarily constant. That is, a transition may occur between a plurality of possible resonances. Therefore, the range of the frequency to be detected is a frequency band having a predetermined width.

Note that the control unit 310 controls the resistance values of the plurality of variable resistance switches 201, thereby controlling the current flowing through the output terminals (27, 28) of the plurality of converter cells 20-k ($1 \leq k \leq N$). Then, anti-resonance occurring is suppressed via the output terminals (27, 28) of the plurality of converter cells 20-$k$ ($1 \leq k \leq N$).

<Gate Drive Voltage Control Flow of Variable Resistance Switch 201>

Next, the control flow of the gate drive voltage of the variable resistance switch 201 illustrated in FIG. 5 will be described with reference to FIG. 6.

Figure 6:
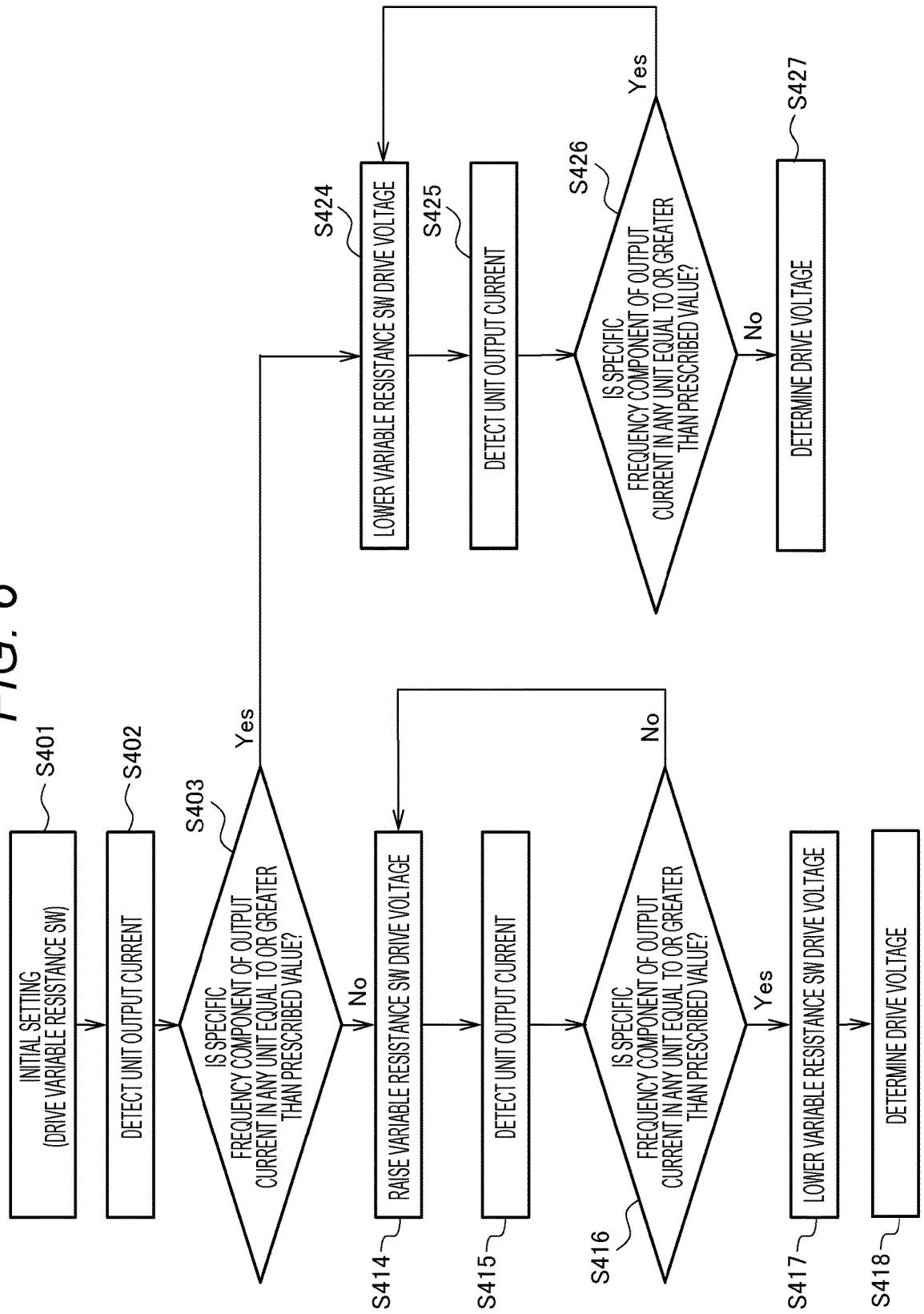
FIG. 6 is a flowchart example of a gate drive voltage control flow of the variable resistance switch of the converter cell according to the first embodiment of the present invention.

FIG. 6 is a view showing a flowchart example of the gate drive voltage control flow of the variable resistance switch 201 of the converter cell according to the first embodiment of the present invention illustrated in FIG. 5.

<<Step S401>>

In step S401, the variable resistance switch (201: FIG. 5) is driven as an initial setting. Then, the process proceeds to step S402.

In the flowchart, the variable resistance switch is appropriately described as "variable resistance SW" for convenience of description.

<<Step S402>>

In step S402, the current sensor 301 illustrated in FIG. 5 "detects the unit output current". That is, the current on the output side of the plurality of converter cells 20-$k$ ($1 \leq k \leq N$) in FIG. 5 is detected by the plurality of current sensors 301.

<<Step S403>>

In step S403, the current values detected by the plurality of current sensors 301 are collected in the control unit 310 illustrated in FIG. 5, and "is specific frequency component (frequency component in predetermined frequency band) of output current in any unit (power conversion unit, converter cell) equal to or greater than prescribed value?" is determined.

If the current (anti-resonant current) of the specific frequency component equal to or greater than the prescribed value is detected by any unit (Yes), it is determined that resonance (anti-resonance) has occurred, and the process proceeds to step S424 in order to shift to a "resonance suppression mode".

If the current (anti-resonant current) of the specific frequency component equal to or greater than the prescribed value is not detected in any unit (No), the resistance of the variable resistance switch can be lowered, and the process proceeds to step S414 in order to shift to a "low resistance mode".

<<Step S414>>

In step S414, the resistance value control signal 322 of the control unit 310 "raises drive voltage of the variable resistance switches" to lower the resistance value of the variable resistance switch 201.

Note that the resistance value of the variable resistance switch is lowered in order to lower the output impedance as the output (output terminals 37 and 38) of the DC power supply and to improve the output characteristics as the DC power supply.

Then, the process proceeds to step S415.

<<Step S415>>

In step S415, "detect (again) unit output current" after "raises drive voltage of the variable resistance switch" in step S414 is performed.

Then, the process proceeds to step S416.

<<Step S416>>

In step S416, "is specific frequency component (frequency component in predetermined frequency band) of output current in any unit (power conversion unit, converter cell) equal to or greater than prescribed value?" is determined.

If the current (anti-resonant current) of the specific frequency component equal to or greater than the prescribed value is not detected in any unit (No), it is determined that the resistance value of the variable resistance switch still has room, and the process returns to step S414 to make an attempt again to lower the resistance value of the variable resistance switch.

If the current (anti-resonant current) of the specific frequency component equal to or greater than the prescribed value is detected by any unit (Yes), it is determined that resonance (anti-resonance) has already occurred, and the process proceeds to step S417.

<<Step S417>>

In step S417, the resonance (anti-resonance) has already occurred because the resistance value of the variable resistance switch is too low, and the resistance value of the variable resistance switch is increased by "lowering the variable resistance switch drive voltage". The voltage at the time of "lowering the variable resistance switch drive voltage" is a voltage "drive voltage" at a stage before it is confirmed that resonance (anti-resonance) has not occurred.

Then, the process proceeds to step S418.

<<Step S418>>

In step S418, the plurality of converter cells 20-$k$ ($1 \leq k \leq N$) and the power conversion device 1 are operated by "determining drive voltage" of the variable resistance switch with a voltage at a previous stage where it is confirmed that resonance (anti-resonance) has not occurred.

<<Step S424>>

In step S424, which is the "resonance suppression mode", the resistance of the variable resistance switch is increased to suppress resonance by "lowering the variable resistance switch drive voltage".

Then, the process proceeds to step S425.

<<Step S425>>

In step S425, although "lowering the variable resistance switch drive voltage" is performed in step S424, it is unclear whether it is an adequate drive voltage, and therefore "detect the unit output current" is performed.

Then, the process proceeds to step S426.

<<Step S426>>

In step S426, "is specific frequency component (frequency component in predetermined frequency band) of output current in any unit (power conversion unit, converter cell) equal to or greater than prescribed value?" is determined.

If the current (anti-resonant current) of the specific frequency component equal to or greater than the prescribed value is detected by any unit (Yes), it is determined that resonance (anti-resonance) continues to occur, and the process returns to step S424.

If the current (anti-resonant current) of the specific frequency component equal to or greater than the prescribed value is not detected in any unit (No), it is determined that the resonance (anti-resonance) is settled, and the process proceeds to step S427.

<<Step S427>>

Since the resonance (anti-resonance) is settled in step S427, in order to employ the drive voltage when the resonance is settled, "determine drive voltage" is performed to operate the plurality of converter cells 20-$k$ ($1 \leq k \leq N$) and the power conversion device 1.

<Supplement to Flowchart of FIG. 6>

The relationship between the flowchart of FIG. 6 and the actual operation will be supplemented below.

In step S401, when the variable resistance SW (variable resistance switch) of the power conversion unit is brought into a conductive state and is shifted to a mode of supplying power to each load, the gate drive voltage of the variable resistance SW is set.

In step S403, current information from the current sensor 301 is input to the control unit 310 (FIG. 5). When the detected current value becomes equal to or less than the prescribed value at the specific frequency and it is determined that the unnecessary resonant current is not flowing (S403 (No)), the gate drive voltage is raised and the drive is performed in the low resistance mode (S414).

In the low resistance mode, an unnecessary resonant current is generated or is raised stepwise to a rated prescribed value. If it is determined that the unnecessary resonant current has occurred from the current detection information during the gate voltage rise (S416 (Yes)), the gate drive voltage is lowered to a voltage at which the resonant current is not generated (S417), and the gate drive voltage is formulated (determined) (S418).

On the other hand, when the detected current value becomes equal to or less than the prescribed value at the specific frequency and it is determined in step S403 that the unnecessary resonant current is flowing (Yes), the gate drive voltage is driven in the resonance suppression mode (S424).

In the resonance suppression mode, the unnecessary resonant current becomes equal to or less than the prescribed value (S426 (No)), or the gate voltage is lowered stepwise to a prescribed value of a lower limit at which the conduction state can be maintained (S424).

If the unnecessary resonant current becomes equal to or less than the prescribed value from the current detection information during the gate voltage reduction, formulation is made based on the gate drive voltage (S427).

As described above, an appropriate drive voltage of the variable resistance switch can be determined by the control flow shown in FIG. 6.

If the power conversion device according to the first embodiment of the present invention is operated in the control flow shown in FIG. 6, the power conversion device can be driven in the mode in which the resistance component of the variable resistance switch (variable resistance SW) 201 is reduced under the condition that the unnecessary resonant current is not generated, and the power conversion efficiency can be improved by reducing the loss in the variable resistance switch.

Conclusions of First Embodiment

In the configuration where the secondary output terminals 27 and 28 of the power conversion unit 20 are connected in parallel as illustrated in FIG. 1, anti-resonance may occur and an unnecessary resonant current may flow between the output-side smoothing capacitors 18 depending on a drive frequency condition of the AC-DC converter 13, which is an AC/DC converter, or a wiring parasitic inductance component between the secondary terminals of the power conversion units connected in parallel.

At this time, in the smoothing capacitor 18 of the secondary output, the unnecessary resonant current flows, whereby capacitor heat generation increases.

On the other hand, as illustrated in FIGS. 4 and 1, the power conversion device of the first embodiment includes the variable resistance switch 201 between one end of the smoothing capacitor 18 and the output terminal 27.

Therefore, the variable resistance switch 201 exists between the smoothing capacitor 18 of the secondary output and the smoothing capacitor 18 of the secondary output of another power conversion unit connected in parallel.

In this configuration, in the anti-resonance phenomenon involving the plurality of smoothing capacitors 18, the conduction resistance of the variable resistance switch 201 is increased when the unnecessary resonant current occurs, so that the resonant current can be suppressed and the heat generation of the capacitor can be reduced.

By reducing the heat generation of the capacitor, a cooling mechanism can be simplified and the necessary capacitor capacitance can be reduced, and the power conversion device can be downsized.

Also when power is supplied from the load side to the power conversion device, that is, from the secondary power supply system 32 to the primary power supply system 31, anti-resonance can be prevented by using the variable resistance switch 201.

Effects of First Embodiment

According to the present invention, it is possible to provide a power converter in which output sides of a plurality of power conversion units are connected in multiple parallel, the power conversion device being downsized by reducing a resonant current between capacitors of units connected in parallel.

It is possible to suppress a ripple current associated with anti-resonance and to reduce heat generation of the capacitor (smoothing capacitor).

By reducing the heat generation of the capacitor, it becomes possible to simplify the cooling mechanism and reduce the required capacitor capacitance, and it is possible to further downsize the power conversion device.

Second Embodiment

The configuration of a power conversion device 1B according to the second embodiment of the present invention will be described with reference to FIG. 7.

Figure 7:
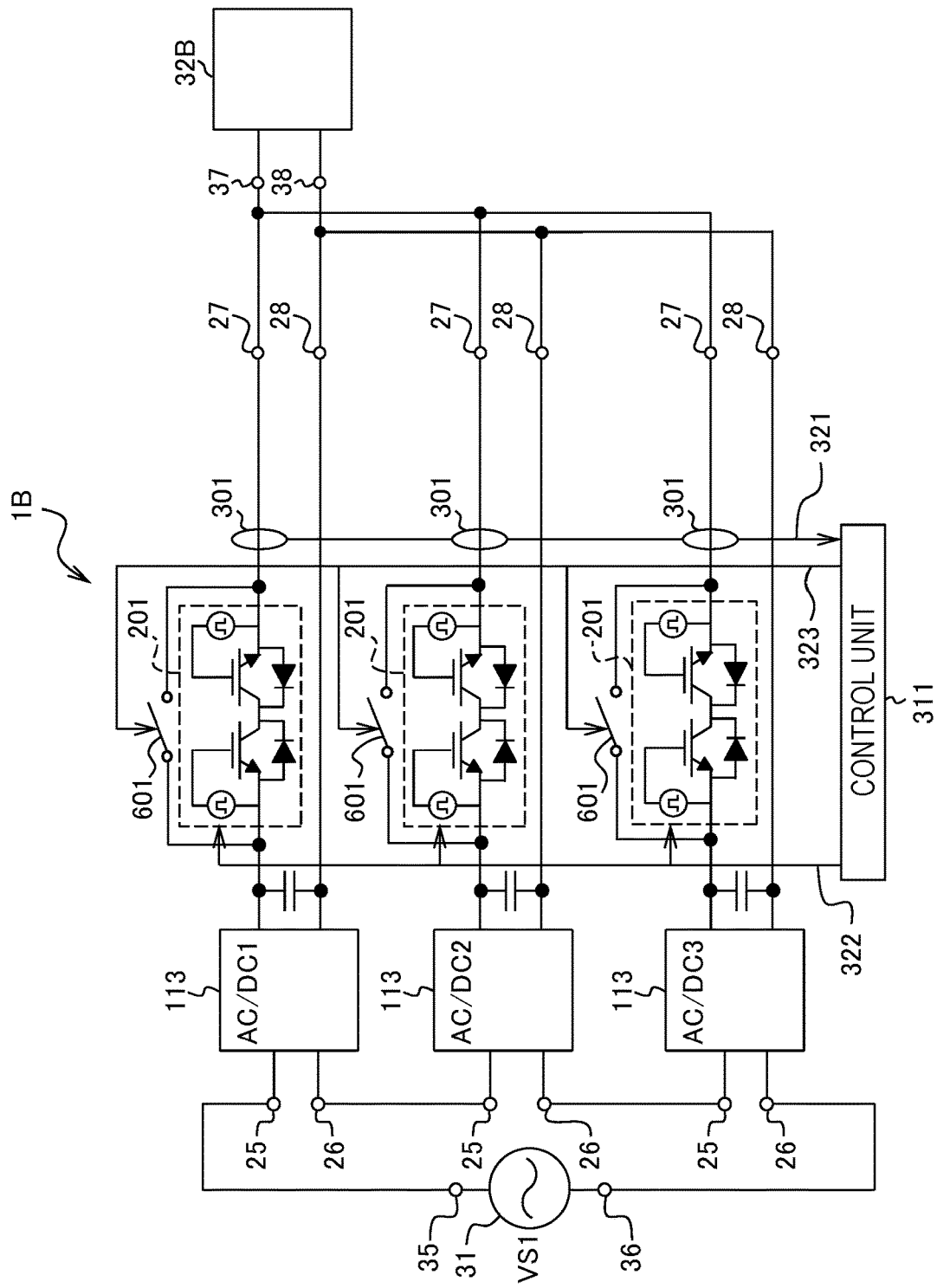
FIG. 7 is a view illustrating a configuration example of a power conversion device according to a second embodiment of the present invention.

FIG. 7 is a view describing a configuration example of the power conversion device according to the second embodiment of the present invention.

In FIG. 7, in the power converter illustrated in FIG. 5, a plurality of bypass switches 601 are provided in parallel to the plurality of variable resistance switches 201, respectively.

The bypass switch 601 bypasses the variable resistance switch 201 connected in parallel.

The bypass switch 601 is a switch having a conduction resistance lower than that of a semiconductor switch such as an IGBT or a MOSFET constituting the variable resistance switch 201 described above, such as an electromagnetic switch or a relay.

Note that a feature of the power conversion device 1B of the second embodiment of the present invention illustrated in FIG. 7 lies in including the bypass switch 601, and practically redundant description of other circuit configurations and functions will be omitted.

In FIG. 7, for simplicity of description, the number of converter cells is limited to three. Since the feature of the power conversion device in the second embodiment of the present invention lies in including the bypass switch 601 as described above, essentially no problem occurs even if the description is made with the number of converter cells limited to three.

The output terminal side of the DC power (DC voltage) of the power conversion device 1B is represented as a secondary power supply system 32B.

The secondary power supply system 32B in FIG. 7 may correspond to a load side of DC power (DC voltage).

In FIG. 7, the plurality of (three) current sensors 301 detects the current of output of the plurality of (three) converter cells, respectively.

The current detection signals 321 detected by the plurality of current sensors 301 are input to a control unit 311.

The control unit 311 detects a specific frequency component (frequency component in a predetermined frequency band) of the current detection signal 321 to detect whether or not anti-resonance has occurred. Then, depending on the presence or absence of the specific frequency component, an opening/closing control signal 323 for controlling opening/closing of the bypass switch 601 is output together with the resistance value control signal 322 to the variable resistance switch 201.

When lowering the resistance value of the variable resistance switch 201 close to the lower limit and determining that there is room for further lowering the resistance value, the control unit 311 short-circuits the bypass switch 601, and if anti-resonance does not occur at that time, improves (reduces resistance) the output impedance as the power conversion device 1B.

Next, the control flow of the variable resistance switch 201 and the bypass switch 601 will be described.

<Control Flow of Bypass Switch 601 and Variable Resistance Switch 201>

The control flow for controlling the bypass switch 601 and the variable resistance switch 201 illustrated in FIG. 7 will be described with reference to FIGS. 8A and 8B.

Figure 8A:
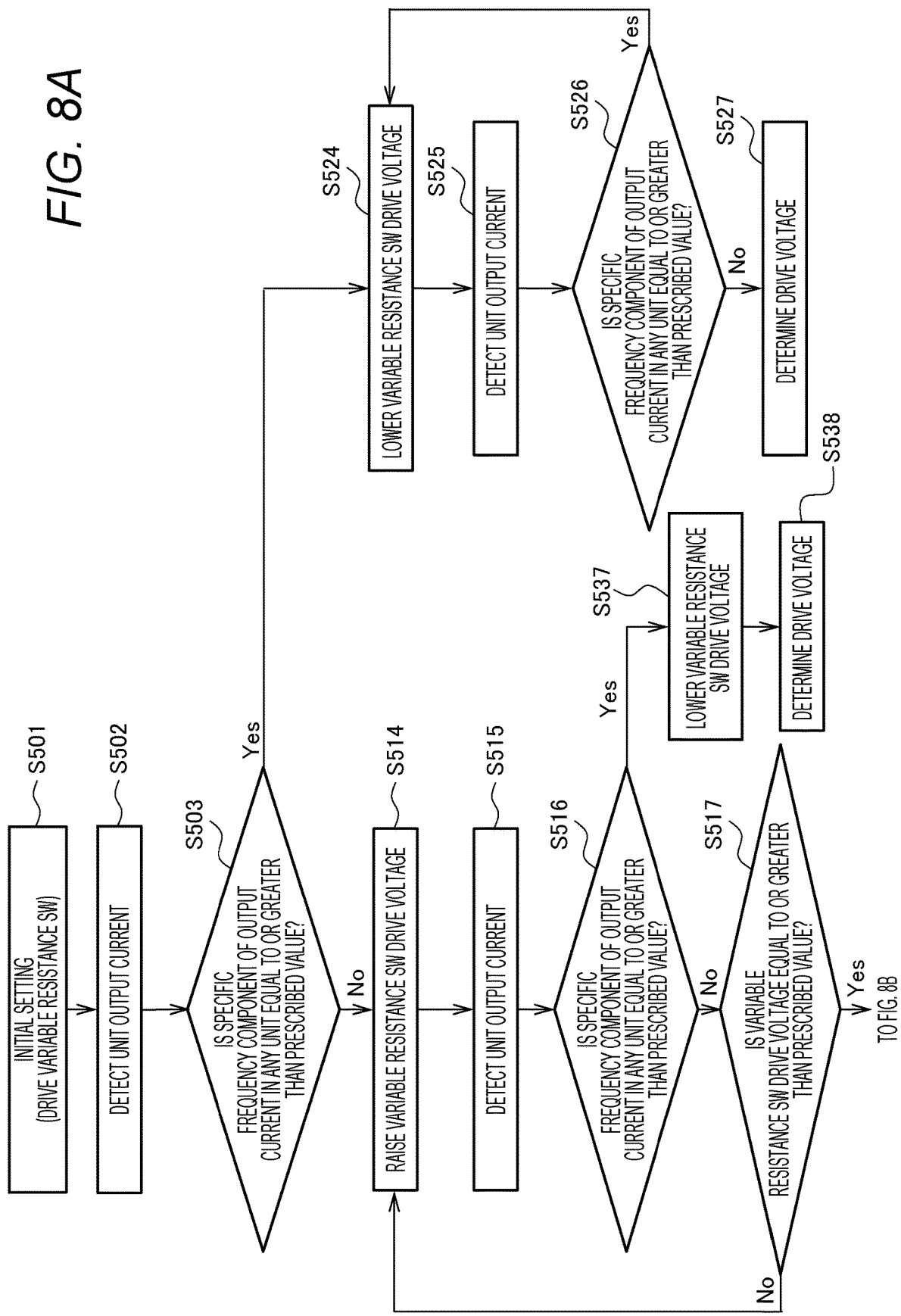
FIG. 8A is a view showing a flowchart example for controlling a bypass switch and a variable resistance switch of a converter cell according to the second embodiment of the present invention.

FIGS. 8A and 8B are views showing flowchart examples for controlling the bypass switch 601 and the variable resistance switch 201 of the converter cell according to the second embodiment of the present invention illustrated in FIG. 7.

In FIG. 8A, steps S501 to S503 correspond to steps S401 to S403 in FIG. 6, and steps S524 to S527 in FIG. 8B correspond to steps S424 to S427 in FIG. 6. Therefore, practically redundant description will be omitted.

Steps S514 to S517 and steps S537 to S538 in FIG. 8A, and steps S518 to S521 and step S541 in FIG. 8B will be described below.

<<Step S514>>

In FIG. 8A, in step S514, the resistance value control signal 322 of the control unit 311 "raises the drive voltage of the variable resistance switches" to lower the resistance value of the variable resistance switch 201.

As described above, the reason why the resistance value of the variable resistance switch is lowered is to lower the output impedance as the output (output terminals 37 and 38) of the DC power supply and to improve the output characteristics as the DC power supply.

Then, the process proceeds to step S515.

<<Step S515>>

In step S515, "detect (again) unit output current" after "raises drive voltage of the variable resistance switch" in step S514 is performed.

Then, the process proceeds to step S516.

<<Step S516>>

In step S516, "is specific frequency component (frequency component in predetermined frequency band) of output current in any unit (power conversion unit, converter cell) equal to or greater than prescribed value?" is determined.

If the current (anti-resonant current) of the specific frequency component equal to or greater than the prescribed value is not detected in any unit (No), it is determined that the resistance value of the variable resistance switch still has room, and the process proceeds to step S517.

If the current (anti-resonant current) of the specific frequency component equal to or greater than the prescribed value is detected by any unit (Yes), it is determined that resonance (anti-resonance) has already occurred, and the process proceeds to step S537.

<<Step S537>>

In step S537, the resonance (anti-resonance) has already occurred because the resistance value of the variable resistance switch is too low, and the resistance value of the variable resistance switch is increased by "lowering the variable resistance switch drive voltage". The voltage at the time of "lowering the variable resistance switch drive voltage" is a voltage "drive voltage" at a stage before it is confirmed that resonance (anti-resonance) has not occurred.

Then, the process proceeds to step S538.

<<Step S538>>

In step S538, the plurality of converter cells 20-$k$ ($1 \leq k \leq 3$) and the power conversion device 1 are operated by "determining drive voltage" of the variable resistance switch with a voltage at a previous stage where it is confirmed that resonance (anti-resonance) has not occurred.

<<Step S517>>

In step S517, it is verified whether the drive voltage of the variable resistance switch can be increased (reduced in resistance) since resonance (anti-resonance) has not occurred.

Specifically, "is variable resistance switch drive voltage equal to or greater than prescribed value?" is determined.

If the variable resistance switch drive voltage is not equal to or greater than the prescribed value (No), the process returns to step S514 to attempt to increase the variable resistance switch drive voltage.

If the variable resistance switch drive voltage is equal to or greater than the prescribed value (Yes), the method of using the bypass switch 601 is more appropriate than further increasing the drive voltage of the variable resistance switch, and thus the process proceeds to step S518 (FIG. 8B).

The following is described with reference to FIG. 8B.

<<Step S518>>

In step S518 in FIG. 8B, the bypass switch (601: FIG. 7) is turned on (ON). That is, both ends of the variable resistance switch 201 are short-circuited by the bypass switch 601.

Then, the process proceeds to step S519.

<<Step S519>>

In step S519, "detect the unit output current" after "turn on bypass switch" in step S518 is performed.

Then, the process proceeds to step S520.

<<Step S520>>

In step S520, "is specific frequency component (frequency component in predetermined frequency band) of output current in any unit (power conversion unit, converter cell) equal to or greater than prescribed value?" is determined.

If the current (anti-resonant current) of the specific frequency component equal to or greater than the prescribed value is not detected in any unit (No), the process proceeds to step S521.

If the current (anti-resonant current) of the specific frequency component equal to or greater than the prescribed value is detected by any unit (Yes), it is determined that resonance (anti-resonance) has already occurred, and the process proceeds to step S541.

<<Step S521>>

In step S521, resonance (anti-resonance) has not occurred even if the bypass switch is turned on, and thus the output impedance characteristics of the power conversion device 1B (plurality of converter cells) and good "hold state of turning on bypass switch" is performed.

That is, the power conversion device 1B is operated with the bypass switch in the ON state.

<<Step S541>>

In step S541, resonance (anti-resonance) has occurred when the bypass switch is turned on, and "turn off bypass switch" is performed.

That is, the power conversion device 1B is operated only with the ON state of the variable resistance switch.

<Supplement to Flowchart of FIGS. 8A and 8B>

The relationship between the flowcharts of FIGS. 8A and 8B and the actual operation will be supplemented below.

The flowcharts of FIGS. 8A and 8B are flowcharts including the control of the bypass switch in addition to the above-described flowchart of FIG. 6.

Therefore, the control flow not associated with the control of the bypass switch becomes the same as that in the flowchart of FIG. 6, and thus redundant description will be omitted.

When the gate voltage of the variable resistance SW is raised (S514) in the low resistance mode (S503 (No)), and the drive voltage of the variable resistance SW reaches the prescribed value (S517 (Yes)) in a state where the detected current value is equal to or less than the prescribed value at a specific frequency (S516 (No)), the bypass switch (bypass SW) 601 (FIG. 7) is controlled to the conduction state. When the bypass SW is in the conduction state and it is determined that the unnecessary resonant current is equal to or less than the prescribed value (S520 (No)), the conduction state of the bypass SW is maintained (held) (S521), and the converter is driven in the bypass SW conduction mode.

On the other hand, when the bypass SW is brought into the conductive state and the detected current value becomes equal to or larger than the prescribed value at a specific frequency (S520 (Yes)), the bypass SW is turned off (S541), and the converter is driven in the variable resistance SW low resistance conduction mode.

As described above, by selectively using an appropriate variable resistance switch and an appropriate bypass switch in the control flow shown in FIGS. 8A and 8B, it becomes possible to improve the power conversion efficiency by reducing the loss in the switch unit (variable resistance switch+bypass switch) without generating an unnecessary resonant current.

That is, the unnecessary resonance suppression mode and the high efficiency operation mode can be switched.

Effects of Second Embodiment

By providing the bypass switch connected in parallel to the variable resistance switch and appropriately selectively using the variable resistance switch and the bypass switch, there is an effect of being able to lower the output impedance and improve the power conversion efficiency without generating the unnecessary resonant current.

Third Embodiment

The configuration of a power conversion device 1C according to the third embodiment of the present invention will be described with reference to FIG. 9.

Figure 9:
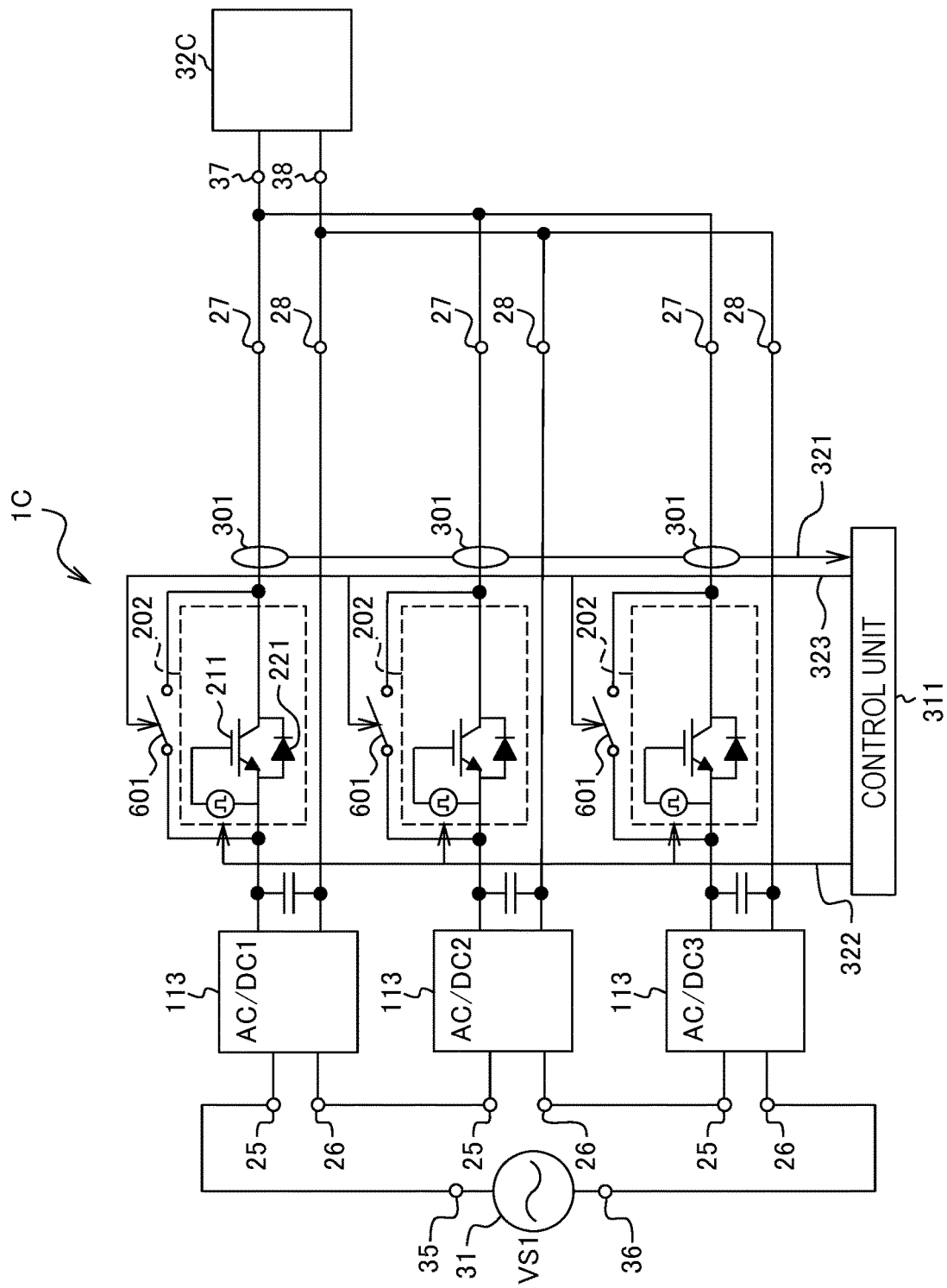
FIG. 9 is a view illustrating a configuration example of a power conversion device according to a third embodiment of the present invention.

FIG. 9 is a view describing a configuration example of the power conversion device according to the third embodiment of the present invention.

In FIG. 9, as a variable resistance switch 202 in the converter cell of the power conversion device 1C, the IGBT element 211 and the parasitic diode 221 are included.

Note that the variable resistance switch 201 illustrated in FIGS. 5 and 7 includes a pair of the IGBT element 211 and the parasitic diode 221, and a pair of the IGBT element 212 and the parasitic diode 222, that is, two pairs.

On the other hand, the variable resistance switch 202 of FIG. 9 includes a pair of the IGBT element 211 and the parasitic diode 221.

The power conversion device 1C in FIG. 9 is different from the power conversion device 1B in FIG. 7 only in the difference between the variable resistance switch 202 in FIG. 9 and the variable resistance switch 201 in FIG. 7.

Other redundant descriptions will be omitted as appropriate.

Also when the variable resistance switch 202 of FIG. 9 is used, it is possible to perform control as a power conversion device similar to that shown in the flowcharts of FIGS. 8A and 8B.

Also in the power conversion device 1C in FIG. 9, it becomes possible to switch between the unnecessary resonance suppression mode and the high efficiency operation mode while reducing the number of elements of the semiconductor switch (variable resistance switch).

Effects of Third Embodiment

Also in the power conversion device 1C of the third embodiment, it becomes possible to switch between the unnecessary resonance suppression mode and the high efficiency operation mode while reducing the number of elements of the semiconductor switch (variable resistance switch).

Fourth Embodiment

The configuration of a power conversion device 1D according to the fourth embodiment of the present invention will be described with reference to FIG. 10.

Figure 10:
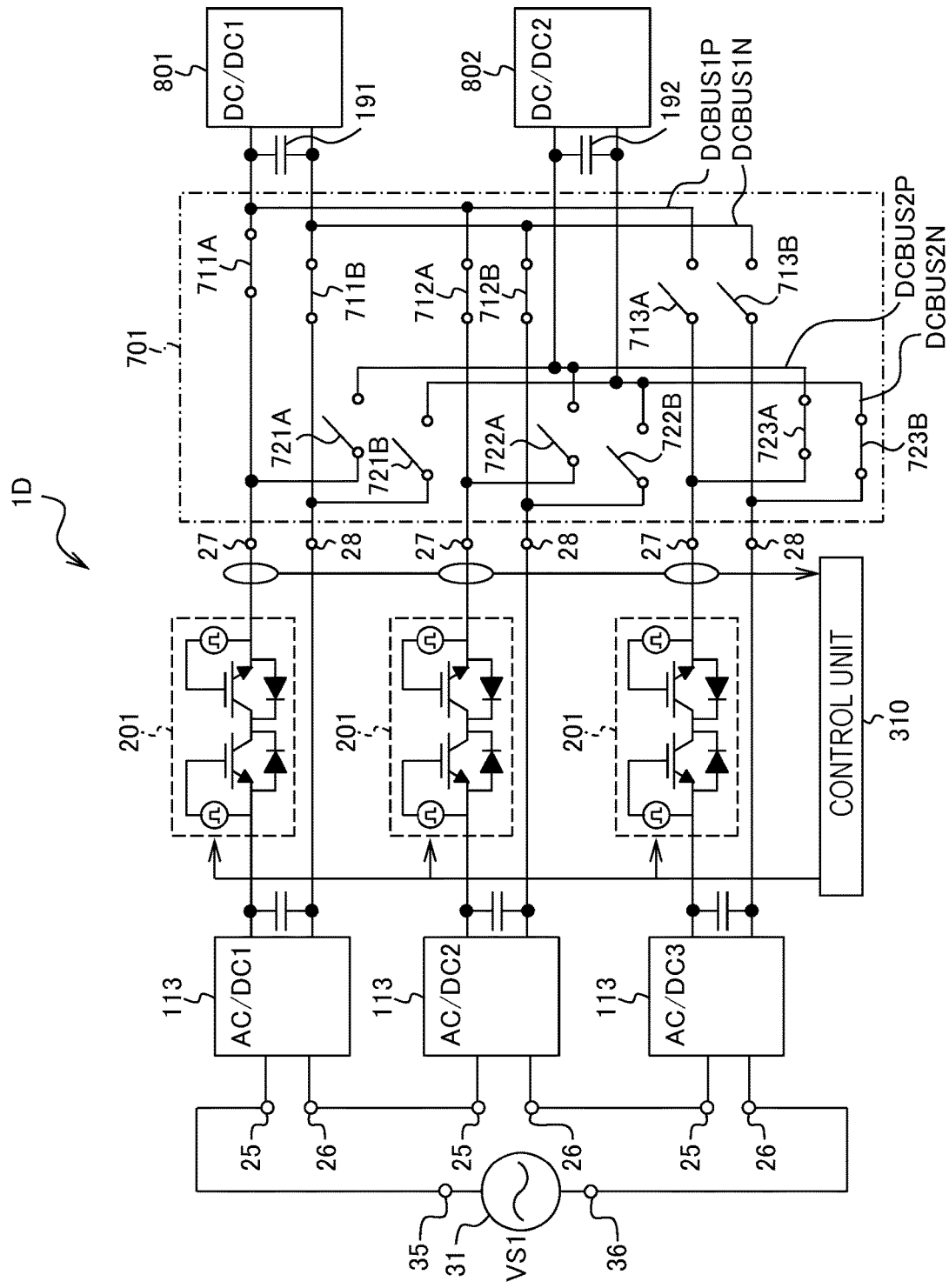
FIG. 10 is a view illustrating a configuration example of a power conversion device according to a fourth embodiment of the present invention.

FIG. 10 is a view describing a configuration example of the power conversion device according to the fourth embodiment of the present invention.

FIG. 10 illustrates the power conversion device 1D further including a parallel number changeover switch 701 that switches the number of parallel connections between connection load (801, 802), which is a DC load, and the power conversion unit (converter cell) on the output side of the power conversion device 1 illustrated in FIG. 5.

In FIG. 5, the number of the converter cells 20-1 to 20-N, which are power conversion units, is N, and accordingly, the AC/DC converters 113 on the input side of the converter cells are described as "AC/DC 1", "AC/DC 2", . . . , and "AC/DC N".

On the other hand, in FIG. 10, for simplicity, three converter cells, which are power conversion units, are illustrated as the AC/DC converter 113 on the input side is indicated as "AC/DC 1", "AC/DC 2", and "AC/DC 3".

In FIG. 10, the connection load (801,802), which is a DC load, is described as "DC/DC 1" and "DC/DC 2".

Note that in FIG. 10, description redundant with FIG. 5 will be omitted as appropriate.

In FIG. 10, the parallel number changeover switch 701 includes first DC buses (DCBUS1P, DCBUS1N) and second DC buses (DCBUS2P, DCBUS2N) that transmit DC power (DC voltage) in a plurality of series.

The parallel number changeover switch 701 includes bus changeover switches (711A, 711B), bus changeover switches (712A, 712B), and bus changeover switches (713A, 713B) that connect the output of the power conversion unit (converter cell) to the first DC buses (DCBUS1P, DCBUS1N).

The parallel number changeover switch 701 includes bus changeover switches (721A, 721B), bus changeover switches (722A, 722B), and bus changeover switches (723A, 723B) that connect the output of the power conversion unit (converter cell) to the second DC buses (DCBUS2P, DCBUS2N).

The first DC buses (DCBUS1P, DCBUS1N) of the parallel number changeover switch 701 is connected to the DC load (DC/DC 1) 801. A smoothing capacitor 191 is connected to the input side of the DC load (DC/DC 1) 801.

The second DC buses (DCBUS2P, DCBUS2N) of the parallel number changeover switch 701 is connected to the DC load (DC/DC 2) 802. A smoothing capacitor 192 is connected to the input side of the DC load (DC/DC 2) 802.

With the above configuration, by adequately switching the plurality of bus changeover switches included in the parallel number changeover switch 701, the power conversion device 1D becomes possible to simultaneously connect the DC power of the plurality of power conversion units (converter cells) to a plurality of loads with one power converter. By appropriately switching the number of parallel connections in accordance with the power amount of the load, highly efficient operation becomes possible.

The parallel number changeover switch 701 adjusts the drive voltage of the variable resistance switch 201 by the control flow shown in FIG. 6 each time the connection load and the number of parallel connections are switched.

Effects of Fourth Embodiment

According to the power conversion device of the fourth embodiment, the parallel number changeover switch enables simultaneous connection to a plurality of loads with one power converter.

By appropriately switching the number of parallel connections in accordance with the power amount of the load, highly efficient operation becomes possible.

Since each converter unit (converter cell) is provided with the variable resistance switch, even when the number of parallel capacitors and the load condition are switched, it becomes possible to suppress an occurrence of anti-resonance and unnecessary resonant current by controlling the gate drive voltage of the variable resistance switch.

Other Embodiments

Note that the present invention is not limited to the embodiments described above, and further includes various modifications. For example, the above-described embodiments have been described in detail for easy description of the present invention, and are not necessarily limited to those having all the described configurations. A part of the configuration of a certain embodiment can be replaced with a part of the configuration of another embodiment, and a part or all of the configuration of another embodiment can be added to, deleted from, or replaced with the configuration of a certain embodiment.

Other embodiments and modifications will be further described below.

<<Resistance Value Control of Variable Resistance Switch of Control Unit>>

With reference to FIG. 5, in the first embodiment, the control unit 310 detects the predetermined frequency component flowing through the plurality of current sensors 301 and uniformly controls the resistance value of the variable resistance switch using the result. However, there is also a method of individually controlling the resistance value of the corresponding variable resistance switch in accordance with individual detection values of the plurality of current sensors 301.

In the method of individually controlling in this manner, it is possible to achieve, with higher accuracy, both characteristics of suppression of anti-resonance and improvement of output characteristics of the power converter.

<<Resistance Value Control of Parallel Number Changeover Switch, Variable Resistance Switch, and Bypass Switch>>

In the fourth embodiment, the case where the drive voltage of the variable resistance switch 201 is adjusted based on the control flow of FIG. 6 every time the connection load or the number of parallel connections is switched by the parallel number changeover switch 701 has been described.

However, it is not limited to the variable resistance switch 201 that performs adjustment when the parallel number changeover switch 701 is used.

The parallel number changeover switch 701 illustrated in FIG. 10 may be used in combination with the power conversion device 1B illustrated in FIG. 7. In this case, the variable resistance switch and the bypass switch are adjusted based on the control flow shown in FIGS. 8A and 8B each time the connection load or the number of parallel connections is switched by the parallel number changeover switch 701.

<<Element of Variable Resistance Switch>>

The variable resistance switch is not limited to the IGBT element. The variable resistance switch may include any of the semiconductor elements such as a MOSFET FET, a super junction MOSFET, and a bipolar transistor.

The semiconductor element may be an N type system switching element or a P type system switching element. However, the polarity of the resistance value control signal for controlling the variable resistance switch is inverted and used.

<<Number of Pairs of Semiconductor Elements Constituting Variable Resistance Switch>>

In FIG. 5, the variable resistance switch includes a total of two pairs of the pair of the IGBT element 211 and the diode 221 and the pair of the IGBT element 212 and the diode 222.

In FIG. 9, the variable resistance switch includes one pair of the IGBT element 211 and the diode 221.

However, the number of pairs is not limited to two or one, and the number of pairs may be three or more.

<<Configuration of Bypass Switch>>

In FIG. 7, the bypass switch 601 has been described as "a switch having a conduction resistance lower than that of a semiconductor switch such as an electromagnetic switch or a relay". However, the present invention is not limited to components other than the semiconductor, such as an electromagnetic switch and a relay.

Also in the semiconductor element, there is also a method in which the bypass switch 601 is configured by the semiconductor element by adopting various techniques such as selection of the shape of the semiconductor element and the voltage to be applied, or adoption of those having characteristics of a low threshold voltage.

<<Number of DC Buses in Parallel Number Changeover Switch Unit>>

In FIG. 10, the DC bus in the parallel number changeover switch unit includes two series of the first DC bus and the second DC bus, but may include three or more series. Although the number of connection loads (DC loads) and the number of series (801, 802) are 2 (series), both may be 3 series or more, and may be generally configured by N series.

<<Connection Method of AC Side of Plurality of Power Conversion Units>>

FIGS. 1, 5, 7, 9, and 10 have been described with the configuration example in which the primary terminals (25, 26) of the plurality of power conversion units (converter cells) are sequentially connected in series.

However, the primary terminals (25, 26) of the plurality of power conversion units (converter cells) are not limited to being connected in series.

Also when the primary terminals (25, 26) of the plurality of power conversion units (converter cells) are connected in parallel to each other, the method of providing a variable resistance switch or a bypass switch on the secondary side (output side) is an effective method for preventing anti-resonance.

<<Configuration of Power Conversion Unit>>

FIGS. 1 and 4 have been described with the case where the configuration of the power conversion unit (converter cell) includes the radio frequency transformer 15. However, it is not essential for the power conversion unit to include a radio frequency transformer.

The AC/DC converter 113 in FIGS. 4, 5, 7, 9, and 10 serves to convert AC power (AC voltage) into DC power (DC voltage), and thus may be configured without including a radio frequency transformer.

<<Number of Current Sensors>>

FIGS. 5, 7, and 9 have been described with the case where the number of current sensors 301 is the same as the number of power conversion units (converter cells).

However, the current sensor 301 is not necessarily provided in all the power conversion units.

When a phenomenon of anti-resonance occurs, a plurality of other power conversion units are generally associated. Therefore, even in a configuration where the number of current sensors 301 does not match the number of power conversion units, it may be possible to adopt a configuration for detecting anti-resonance.

<<Arrangement of Current Sensors>>

In FIGS. 5, 7, and 9, the current sensor 301 may be incorporated into the power conversion unit as an element constituting the power conversion unit (converter cell).

After the plurality of power conversion units are configured, the plurality of current sensors 301 may be deployed in the plurality of power conversion units.

REFERENCE SIGNS LIST

1, 1B, 1C, 1D, 1U, 1V, 1W power conversion device
11 first AC-DC converter (AC-DC converter)
12 second AC-DC converter (AC-DC converter)
13 secondary AC-DC converter (AC-DC converter)
15 radio frequency transformer
17 primary smoothing capacitor (smoothing capacitor)
18 output-side smoothing capacitor (smoothing capacitor)
191, 192 smoothing capacitor
25, 26 primary terminal, input terminal
27, 28 secondary terminal, output terminal, secondary output terminal
20, 20-1, 20-2, 20-k, 20-N converter cell, power conversion unit, unit
31 primary power supply system
32, 32A, 32B, 32C secondary power supply system, DC load system
35 AC power supply terminal, input terminal
36 AC power supply terminal, primary reference terminal, input terminal, terminal
37 DC power supply terminal, output terminal
38 DC power supply terminal, secondary reference terminal, output terminal, terminal
101 primary power conversion unit, frequency converter
102 secondary power conversion unit
113 AC/DC converter
201, 202 variable resistance switch
211, 212 transistor, IGBT element
221, 222 diode, parasitic diode
301 current sensor, current detector
310, 311 control unit
321 current detection signal
322 resistance value control signal
323 opening/closing control signal
601 bypass switch
701 parallel number changeover switch unit
711A, 711B, 712A, 712B, 713A, 713B, 721A, 721B, 722A, 722B, 723A,
723B bus changeover switch
801, 802 DC load, connection load
DCBUS1P, DCBUS1N first DC bus
DCBUS2P, DCBUS2N second DC bus

The invention claimed is:

1. A power conversion device, comprising:
a plurality of power conversion units including two primary input terminals and two secondary output terminals;
a plurality of current sensors that each detect a current flowing through a secondary output terminal of each of the power conversion units; and
a control unit that measures a frequency component in a predetermined frequency range of a current detected by each of the plurality of current sensors, wherein
each of the power conversion units includes
an AC/DC converter that converts AC power having been input between the two primary input terminals to DC power that is output between the two secondary output terminals,
an output-side smoothing capacitor connected in parallel between the two secondary output terminals, and smoothing an output voltage output between the two secondary output terminals, and
a variable resistance switch connected between one end of the output-side smoothing capacitor and one end of the secondary output terminal,
the control unit controls resistance values of a plurality of the variable resistance switches according to magnitudes of predetermined frequency components of currents detected by the plurality of current sensors, and
the secondary output terminals of the plurality of power conversion units are connected in parallel to each other to constitute a DC power supply terminal as the power conversion device.

2. The power conversion device according to claim 1, wherein the plurality of current sensors are respectively included in the plurality of power conversion units.

3. The power conversion device according to claim 1, wherein the AC/DC converter is configured to include a frequency converter that converts a frequency of an AC voltage input from the two primary input terminals into a high frequency, a radio frequency transformer that receives a first AC voltage output from the frequency converter, converts the first AC voltage into a second AC voltage, and outputs the second AC voltage, and a secondary AC-DC converter that receives an AC output from the radio frequency transformer, converts the AC output into DC, and outputs the DC.

4. The power conversion device according to claim 1, wherein the two primary input terminals of the plurality of power conversion units are connected in series between the plurality of power conversion units.

5. The power conversion device according to claim 3, wherein the frequency converter is configured to include:
  a first AC-DC converter that converts an input AC into a direct current and outputs the direct current;
  a primary smoothing capacitor that smooths a DC output voltage of the first AC-DC converter; and
  a DC-AC converter that converts DC output from the first AC-DC converter into AC and outputs the AC.

6. The power conversion device according to claim 1, wherein the variable resistance switch is configured to include a transistor and a diode connected in parallel.

7. The power conversion device according to claim 6, wherein the control unit includes a mechanism capable of varying a drive voltage of the transistor of the variable resistance switch.

8. The power conversion device according to claim 7, wherein a conduction resistance characteristic of the variable resistance switch is controlled by the drive voltage of the transistor.

9. The power conversion device according to claim 6, wherein the variable resistance switch is configured with a plurality of sets of transistors and diodes, each set of which includes a transistor connected in parallel with a diode, and wherein the plurality of sets of transistors and diodes are connected in series.

10. The power conversion device according to claim 7, comprising a bypass switch connected in parallel with the variable resistance switch, wherein
  opening and closing of the bypass switch are controlled by the control unit.

11. The power conversion device according to claim 10, wherein the bypass switch is configured to include an electromagnetic switch or a relay.

12. The power conversion device according to claim 1, comprising:
  a DC bus that transmits a plurality of pieces of DC power; and
  a parallel number changeover switch unit including a plurality of bus changeover switches, wherein
  when the parallel number changeover switch unit selectively connects the plurality of bus changeover switches, DC output of a secondary output terminal of each of a plurality of the power conversion units is selectively supplied to a plurality of DC loads via a plurality of the DC buses.

* * * * *